US009951871B2

(12) United States Patent
Aksit et al.

(10) Patent No.: US 9,951,871 B2
(45) Date of Patent: Apr. 24, 2018

(54) BRUSH SEAL ASSEMBLY

(71) Applicant: DOOSAN HEAVY INDUSTRIES CONSTRUCTION CO., LTD., Gyeongsangnam-do (KR)

(72) Inventors: Mahmut Faruk Aksit, Istanbul (TK); Dan Hasnedl, Gyeongsangnam-do (KR)

(73) Assignee: DOOSAN Heavy Industries Construction CO., LTD., Gyeongsangnam-do (KR)

( * ) Notice: Subject to any disclaimer, the term of this patent is extended or adjusted under 35 U.S.C. 154(b) by 246 days.

(21) Appl. No.: 14/742,455

(22) Filed: Jun. 17, 2015

(65) Prior Publication Data
US 2015/0361816 A1 Dec. 17, 2015

(30) Foreign Application Priority Data

Jun. 17, 2014 (KR) .................. 10-2014-0073705
Jun. 17, 2014 (KR) .................. 10-2014-0073707

(51) Int. Cl.
*F01D 11/00* (2006.01)
*F16J 15/3288* (2016.01)

(52) U.S. Cl.
CPC ......... *F16J 15/3288* (2013.01); *F01D 11/001* (2013.01); *F05D 2220/30* (2013.01); *F05D 2220/31* (2013.01); *F05D 2240/56* (2013.01)

(58) Field of Classification Search
CPC ...... F01D 11/02; F01D 11/04; F05D 2240/56; F05D 2240/571; F16J 15/3284; F16J 15/3288
USPC ................. 415/173.3, 174.2, 174.5; 277/355
See application file for complete search history.

(56) References Cited

U.S. PATENT DOCUMENTS

| 6,302,400 B1 | 10/2001 | Werner et al. |
| 6,331,006 B1 * | 12/2001 | Baily ................ F01D 11/08 277/355 |
| 6,790,001 B2 | 9/2004 | Turnquist et al. |
| 2002/0081195 A1 * | 6/2002 | Wolfe ............... F01D 11/127 415/173.3 |
| 2004/0018085 A1 * | 1/2004 | Dhar ................ F01D 11/00 415/174.2 |

(Continued)

FOREIGN PATENT DOCUMENTS

| EP | 1510655 A1 | 3/2005 |
| FR | 2 998 611 A1 | 5/2014 |
| FR | 2998611 A1 | 5/2014 |

(Continued)

OTHER PUBLICATIONS

Chinese Office Action in 201510290991.6, dated Jan. 18, 2017.
(Continued)

*Primary Examiner* — Marina Tietjen
*Assistant Examiner* — Paul J Gray
(74) *Attorney, Agent, or Firm* — IVENSTONE Patent, LLC

(57) ABSTRACT

A brush seal assembly may seal a gap between a diaphragm and a rotor of a turbine. The brush seal assembly includes a brush, one end of which is inserted in a rotor facing surface of a diaphragm while the other end thereof protrudes toward a rotor, and a support strip spaced apart from one side of the brush so that one side end portion of the support strip is fixed and the other side end portion thereof supports one side of the brush.

19 Claims, 17 Drawing Sheets

(56) References Cited

U.S. PATENT DOCUMENTS

2009/0072486 A1\* 3/2009 Datta .................. F16J 15/3288
  277/355

FOREIGN PATENT DOCUMENTS

| | | |
|---|---|---|
| GB | 2188121 A | 9/1987 |
| JP | 3-28579 A | 2/1991 |
| JP | 7-55018 A | 3/1995 |
| JP | 11-153230 A | 6/1999 |
| JP | 2001-317634 A | 11/2001 |
| JP | 2001317634 A | 11/2001 |
| JP | 2001-349440 A | 12/2001 |
| JP | 2003-518599 A | 6/2003 |
| JP | 2009-024872 A | 2/2009 |
| JP | 2010-525254 A | 7/2010 |
| WO | 01/48404 A1 | 7/2001 |
| WO | 2008/127244 A1 | 10/2008 |
| WO | 2014/083280 A1 | 6/2014 |

OTHER PUBLICATIONS

Korean Office Action dated Aug. 28, 2015 in corresponding KR application No. 10-2014-0073705.
Korean Office Action dated Aug. 28, 2015 in corresponding KR application No. 10-2014-0073707.
Japanese Office Action Action dated May 10, 2016 in counterpart Japanese Application No. 2015-121262.

\* cited by examiner

BRUSH SEAL ASSEMBLY

CROSS-REFERENCE TO RELATED APPLICATIONS

This application claims priority to Korean Patent Applications Nos. 10-2014-0073705 and 10-2014-0073707 filed on Jun. 17, 2014 the disclosures of which are incorporated herein by reference in their entirety.

BACKGROUND

Exemplary embodiments relate to a brush seal assembly, and more particularly, to a brush seal assembly for sealing a gap between a diaphragm and a rotor of a turbine.

Generally, a turbine is a power generation apparatus which converts heat energy of a fluid such as gas or steam into mechanical energy, and includes a rotor having a plurality of buckets to axially rotate by the fluid and a casing which is installed to surround the rotor and has a plurality of diaphragms.

A gas turbine includes a compressor, a combustor, and a turbine. In the gas turbine, outside air is introduced and compressed by rotation of the compressor and is then transferred to the combustor, and combustion is performed by mixture of the compressed air and fuel in the combustor. High-temperature and high-pressure gas generated by the combustor drives a generator by rotating a rotor of the turbine while passing through the turbine.

In a steam turbine, a high-pressure turbine, an intermediate-pressure turbine, and a low-pressure turbine are interconnected in series or in parallel to rotate a rotor. When the steam turbine has a series structure, the high-pressure turbine, the intermediate-pressure turbine, and the low-pressure turbine share one rotor.

In the steam turbine, each turbine has a diaphragm and a bucket on the basis of the rotor in a casing. Steam rotates the rotor while passing through the diaphragm and the bucket to drive a generator.

Since each of the gas turbine and the steam turbine has a structure in which a rotary body (for instance, a rotor) is rotated relative to a stationary body (for instance, a diaphragm), a high-temperature and high-pressure fluid is leaked to a gap between the stationary body and the rotary body and such a fluid leak causes deterioration of energy efficiency due to a power loss. For this reason, an effort for reduction of the fluid leak generated through the gap between the rotary body and the stationary body may be made.

The gap between the rotary body and the stationary body may be decreased to reduce the fluid leak, but there are various limits in decreasing the gap.

When the gap is excessively small, vibration is caused by rubbing due to interference between the rotary body and the stationary body when the rotary body axially rotates, and may result in serious damage of devices.

Meanwhile, since the rotary body and the stationary body are heated by hot steam introduced from a boiler in the steam turbine, the rotary body and the stationary body are expanded or contracted from several mm to several tens of mm according to positions thereof when the steam turbine is operated or stopped. In this case, the rotary body and the stationary body are differently expanded because of being made of different materials, and are expanded in different directions according to the structure of the turbine. For this reason, the rotary body interferes with the stationary body when the steam turbine is operated, thereby causing the rubbing.

BRIEF SUMMARY

An object is to provide a brush seal assembly capable of reducing heat and wear generated by rubbing with a rotor.

Another object is to provide a brush seal assembly capable of increasing turbine efficiency through improvement in sealing effect.

A further object is to provide a brush seal assembly capable of being easily assembled through a simple structure and having price competitiveness.

Other objects and advantages can be understood by the following description, and become apparent with reference to the embodiments. Also, it is obvious to those skilled in the art to which the present invention pertains that the objects and advantages can be realized by the means as claimed and combinations thereof.

In accordance with one aspect, a brush seal assembly includes a brush, one end of which is inserted in a rotor facing surface of a diaphragm while the other end thereof protrudes toward a rotor, and a support strip spaced apart from one side of the brush so that one side end portion of the support strip is fixed and the other side end portion thereof supports one side of the brush.

One end of the brush may be inserted into a brush insertion groove formed on the rotor facing surface of the diaphragm, and one side end portion of the support strip may be inserted into a support strip insertion groove spaced apart from one side of the brush insertion groove.

The support strip may include an insertion portion inserted into the support strip insertion groove, an extension portion extending toward the brush from one end of the insertion portion, and a support portion bent from one end of the extension portion to support one side of the brush.

The support portion may be formed with at least one bent portion.

The brush insertion groove may include a first insertion groove into which one of the brush is inserted, and a second insertion groove extending toward the rotor from the first insertion groove while having a smaller width than the first insertion groove.

The second insertion groove may have a stepped portion formed on a brush facing surface thereof so that a predetermined clearance is formed between the brush and the stepped portion.

In accordance with another aspect, a brush seal assembly includes a brush, one end of which is inserted in a rotor facing surface of a diaphragm while the other end thereof protrudes toward a rotor, a first support strip supporting one side of the brush, a first anchoring member supporting the other side of the brush, and a second support strip spaced apart from one side of the brush so that one side end portion of the second support strip is fixed and the other side end portion thereof supports one side of the brush.

One end of the brush and one end of the first support strip may be inserted into a brush insertion groove formed on the rotor facing surface of the diaphragm, and one side end portion of the second support strip may be inserted into a second support strip insertion groove spaced apart from one side of the brush insertion groove.

The brush seal assembly may further include a second anchoring member press-fitted into the second support strip insertion groove in order to fix the second support strip into the second support strip insertion groove.

The first support strip may include a first support portion supporting one side surface of the brush, a round portion rounded from one end of the first support portion so as to surround one end of the brush, and a first extension portion extending from one end of the round portion so as to cover a portion of the other side surface of the brush.

The second support strip may include an insertion portion inserted into the second support strip insertion groove, a second extension portion extending toward the brush from one end of the insertion portion, and a second support portion bent from one end of the second extension portion to support one side of the brush.

In accordance with a further aspect, a brush seal assembly includes a brush, one end of which is inserted in one side of a diaphragm while the other end thereof protrudes toward a rotor, a support strip supporting one side of the brush, and an auxiliary strip surrounding the brush and the support strip.

An intermediate portion of the auxiliary strip may be inserted into a brush insertion groove formed on a back surface of the diaphragm, and both sides of the auxiliary strip may be respectively inserted into auxiliary strip insertion grooves formed at both sides of the brush insertion groove.

The auxiliary strip may include a first insertion portion inserted into the brush insertion groove, second insertion portions inserted into the auxiliary strip insertion grooves, connection portions connecting both ends of the first insertion portion to respective ends of the second insertion portions, and a blade portion extending toward the rotor from the other end of each of the second insertion portions.

The brush seal assembly may further include an anchoring member press-fitted into each of the auxiliary strip insertion grooves such that one side of the auxiliary strip is fixed into the auxiliary strip insertion groove.

The support strip may include a support portion supporting one side surface of the brush and a round portion rounded from one end of the support portion so as to surround one end of the brush.

The support strip may have the round portion made of a material having elastic restoring force.

The support strip may have the support portion made of an elastic material such that elastic restoring force of the support portion is maintained in a longitudinal direction.

The blade portion may be made of an elastic material for maintaining elastic restoring force.

The blade portion may include a first elastic portion extending upward from a lower end thereof, and a second elastic portion extending transversely from an upper end of the first elastic portion.

The anchoring member may include an anchoring body inserted into the auxiliary strip insertion groove while having a shape corresponding to the auxiliary strip insertion groove, and an anchoring extension portion extending downward from the anchoring body in a state of coming into close contact with the auxiliary strip.

It is to be understood that both the foregoing general description and the following detailed description are exemplary and explanatory and are intended to provide further explanation of the invention as claimed.

BRIEF DESCRIPTION OF THE DRAWINGS

The above and other objects, features and other advantages will be more clearly understood from the following detailed description taken in conjunction with the accompanying drawings, in which.

DETAILED DESCRIPTION

A gap between a stationary body and a rotary body may be sealed using a labyrinth seal. A technique may be used involving removing a gap between a stationary body and a rotary body and sealing the gap through flexible contact therebetween using a brush seal made by coupling a brush to a labyrinth seal.

Figure 1:
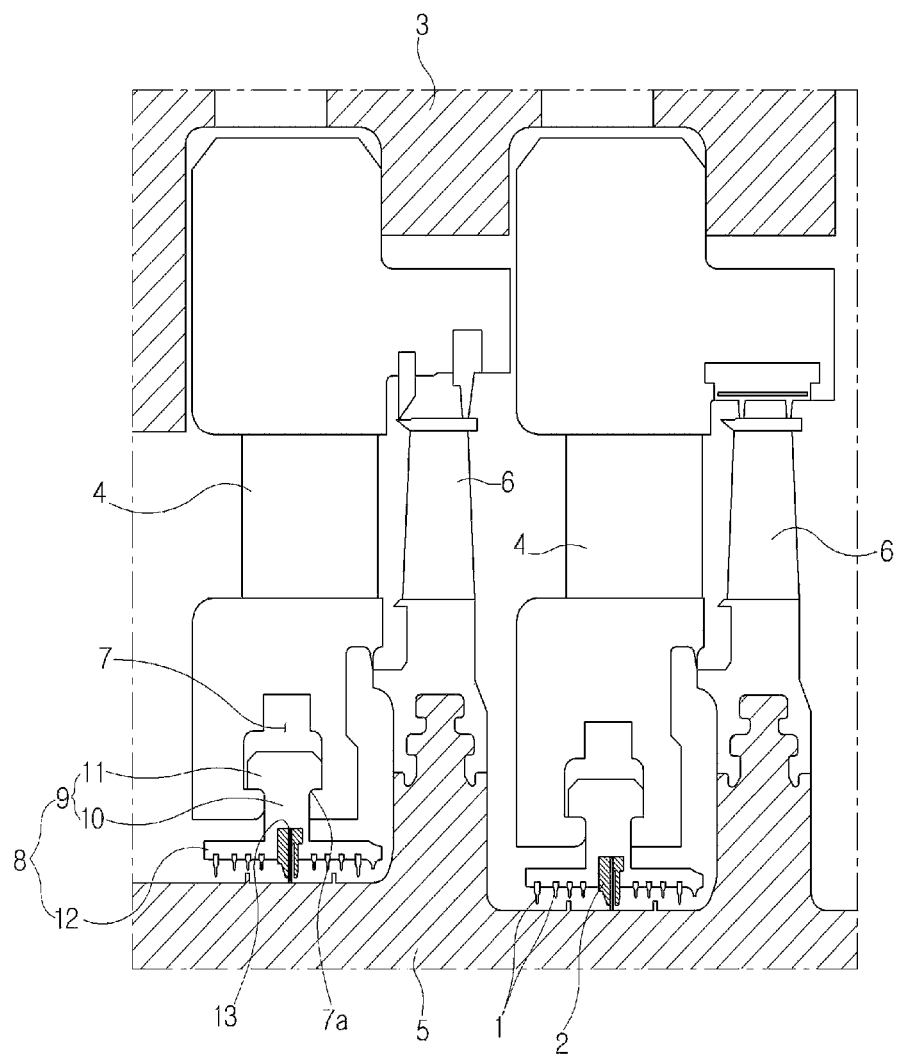
FIG. 1 is a view schematically illustrating an example in which a labyrinth seal and a brush seal are applied to a gap between a stationary body and a rotary body in a steam turbine.

FIG. 1 is a view illustrating an example in which a labyrinth seal 1 and a brush seal 2, the brush seal containing a brush insertion groove 13, are applied to a gap between a stationary body and a rotary body in a steam turbine. The stationary body includes a casing 3 and a diaphragm 4, and the rotary body includes a rotor 5 and a bucket 6.

The diaphragm 4 is fixedly coupled to the casing 3 and is provided adjacent to the bucket 6, and the bucket 6 axially rotates integrally with the rotor 5 in a state adjacent to the diaphragm 4.

In this case, it is necessary to seal a gap between the diaphragm 4 and the bucket 6 and a gap between the diaphragm 4 and the rotor 5 for airtightness therebetween.

Figure 2:
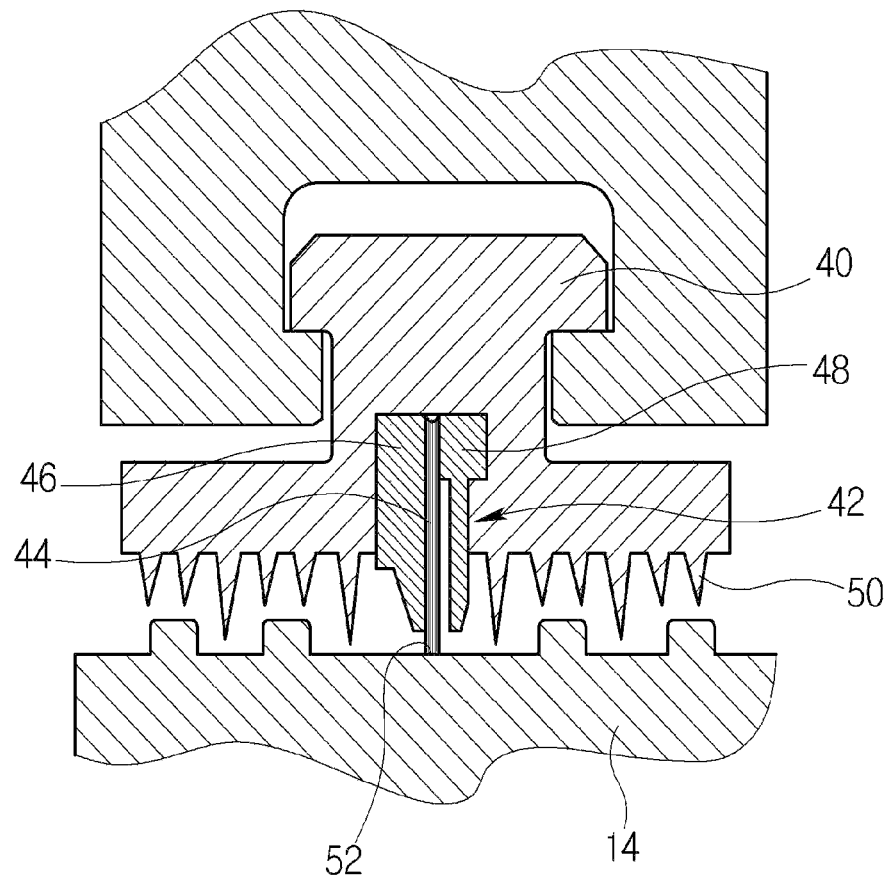
FIG. 2 is a view schematically illustrating an example of a conventional brush seal assembly.

FIG. 2 is a view illustrating a brush seal that illustrates an example in which a labyrinth seal 50 and a brush seal 42 are provided on a back surface of a seal ring 40 and a tip portion 52 of a brush 44 comes into contact with an outer peripheral surface of a rotor 14.

Here, the brush seal 42 includes a brush 44 and a pair of plates 46 and 48 arranged at both front and rear sides of the brush 44 to support the brush 44. Tip portions of the plates 46 and 48 are spaced apart from the outer peripheral surface of the rotor 14 in order to prevent heat generated when the plates 46 and 48 come into contact with the rotor 14.

In this case, when a distance between the tip portions of the plates 46 and 48 and the rotor 14 is increased, an amount of fluid leaked to the distance is increased. On the other hand, when the distance is decreased, heat and vibration may be generated due to rubbing between the plates 46 and 48 and the rotor 14.

A brush seal assembly according to exemplary embodiments will be described below in more detail with reference to the accompanying drawings. The description, however, is exemplary and should not be construed as limited to the embodiments set forth herein. Rather, these embodiments are provided so that this disclosure will be thorough and complete, and will fully convey the scope to those skilled in the art. Throughout the disclosure, like reference numerals refer to like parts throughout the various figures and embodiments. The drawings are not necessarily to scale and in some instances, proportions may have been exaggerated in order to clearly illustrate features of the embodiments.

Figure 3:
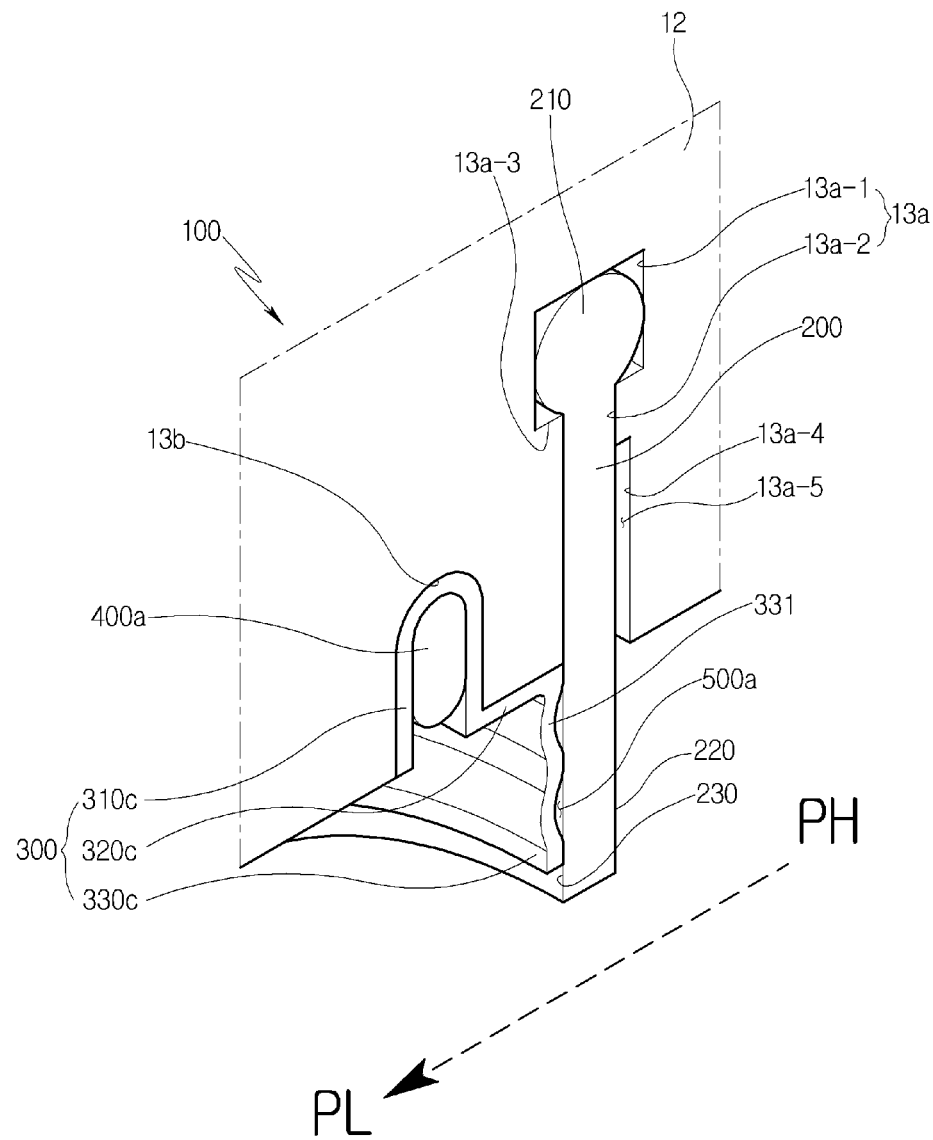
FIG. 3 is a view schematically illustrating a brush seal assembly according to a first embodiment.

FIG. 3 is a view schematically illustrating a brush seal assembly according to a first embodiment.

Referring to FIG. 1 or 3, a seal mounting groove 7 is formed on one surface of a diaphragm 4 facing a rotor 5, and a sealing body 8 is coupled to the seal mounting groove 7.

The sealing body 8 has a ring shape which entirely surrounds the rotor 5, and includes a coupling portion 9 which is inserted into and coupled to the seal mounting groove 7, and a body portion 12 having a width enlarged toward an outer peripheral surface of the rotor 5 from one side of the coupling portion 9.

In this case, the coupling portion 9 of the sealing body 8 includes an insertion portion 10 inserted into the seal mounting groove 7, and a latching portion 11 which has a width enlarged from one side of the insertion portion and is caught by a jaw 7a of the seal mounting groove 7 to be coupled thereto.

The body portion 12 of the sealing body 8 has a width enlarged to an opposite side of the insertion portion 10 so as to face the latching portion 11, and includes a plurality of labyrinth seals 1 protruding from a back surface thereof so as to be spaced apart from each other in a width direction thereof.

One side end portion of the brush seal assembly, which is designated by reference numeral 100, is inserted into and mounted to a groove formed on the back surface of the body portion 12. The brush seal assembly 100 includes a brush 200 and a support strip 300 supporting one side of the brush 200.

The body portion 12 has a brush insertion groove 13a and a support strip insertion groove 13b which are formed on the back surface thereof. The brush insertion groove 13a is formed at a center on the back surface of the body portion 12, and the support strip insertion groove 13b is spaced apart by a predetermined distance in the width direction of the body portion 12 from one side of the brush insertion groove 13a.

Each cross-sectional shape of the brush insertion groove 13a and the support strip insertion groove 13b may be properly selected as occasion demands. For example, the brush insertion groove 13a has a square cross-sectional shape, and the support strip insertion groove 13b has an arc bottom surface formed in a recessed round form.

The brush 200 includes a plurality of bristles, and standards such as a thickness of each bristle of the brush 200 may be properly selected as occasion demands.

One end of the brush 200 is inserted into the brush insertion groove 13a formed at the center on the back surface of the body portion 12 and the other end thereof extends toward the outer peripheral surface of the rotor 5 (see FIG. 1), so that a tip of the brush 200 comes into contact with the outer peripheral surface of the rotor 5. Consequently, both axial sides of the rotor 5 on the basis of the brush 200 are sealed by the brush 200.

In the brush seal assembly according to the present embodiment, a right pressure PH of the brush 200 is relatively higher than a left pressure PL when viewed in the drawing, and the brush 200 seals a fluid flowing from a high-pressure region to a low-pressure region.

One end of the brush 200 has a larger cross-sectional width than the other end thereof in order to prevent separation of the brush 200 from the brush insertion groove 13a. For example, a head portion 210 having a circular cross-sectional shape is formed at one end of the brush 200.

The brush insertion groove 13a includes a first insertion groove 13a-1 into which one of the brush 200 is inserted, and a second insertion groove 13a-2 extending toward the rotor 5 from the first insertion groove 13a-1. The second insertion groove 13a-2 may have a smaller width than that of the first insertion groove 13a-1. Thus, the head portion 210 of the brush 200 inserted into the first insertion groove 13a-1 is caught by a jaw 13a-3 of the first insertion groove 13a-1 to be prevented from separation in a direction of the second insertion groove 13a-2.

In addition, a stepped portion 13a-4 is formed on a brush facing surface of the second insertion groove 13a-2 facing a high-pressure region-side one surface 220 of the brush 200, and thus a predetermined clearance 13a-5 is formed between the brush 200 and the stepped portion 13a-4. This allows a fluid in the high-pressure region to be introduced into the clearance 13a-5 so as to uniformly distribute high pressure concentrated on a portion protruding outward of the body portion 12 from the brush 200. The support strip 300 has a plate ring shape having a thin thickness, and may be made of a material such as synthetic resin having heat resistance and elasticity in addition to metal.

One side end portion of the support strip 300 is fixedly inserted into the support strip insertion groove 13b, and the other side end portion thereof supports a low-pressure region-side one surface 230 of the brush 200 corresponding to one side of the brush 200.

The support strip 300 according to the first embodiment includes an insertion portion 310c inserted into the support strip insertion groove 13b, an extension portion 320c extending toward the brush 200 from one end of the insertion portion 310c, and a support portion 330c bent from one end of the extension portion 320c to support one side of the brush 200.

In this case, the insertion portion 310c inserted into the support strip insertion groove 13b is pressed toward an inner wall of the support strip insertion groove 13b by an anchoring member 400a press-fitted into the support strip insertion groove 13b so as to be tightly fixed thereto.

The extension portion 320c of the support strip 300 extends from one end, which is adjacent to the brush 200, of both ends of the insertion portion 310c along the back surface of the body portion 12 toward the low-pressure region-side one surface 230 of the brush 200, and preferably comes into close contact with the back surface of the body portion 12.

The support portion 330c of the support strip 300 is vertically bent toward the rotor 5 from one end of the extension portion 320c coming into contact with the low-pressure region-side one surface 230 of the brush 200.

In this case, it is preferable that a rotor facing end of the support portion 330c is further spaced radially outwardly from the rotor 5 than a rotor facing end of the brush 200 corresponding to the other end of the brush 200. This prevents rubbing from being generated between the support strip 300 and the rotor 5, and a tip portion of the support portion 330c of the support strip 300 is further spaced from the outer peripheral surface of the rotor 5 compared to the tip portion of the brush 200 to be located inside the tip portion of the brush 200.

However, since the support strip 300 has elasticity even though the rubbing is generated between the support strip 300 and the rotor 5, heat and wear generated by the rubbing with the rotor 5 may be reduced. When the support strip 300 according to the first embodiment is applied to the brush seal assembly, a distance between the support strip 300 and the rotor 5 is decreased compared to the conventional plates 46 and 48 (see FIG. 2), thereby enabling sealing efficiency to be enhanced.

According to the first embodiment, the support portion 330c of the support strip 300 is formed with at least one bent portion 331. An example in which the bent portion 331 has an arc cross-sectional shape is illustrated in the first embodiment. However, the bent portion 331 may alternatively have a polygonal cross-sectional shape such as a semicircular cross-sectional shape, a triangular cross-sectional shape, or a square cross-sectional shape, etc.

Alternatively, a plurality of bent portions 331 may be formed to be spaced apart from each other, or may be continuously formed in a wave form. That is, standards such as the number and protrusion heights of bent portions and a distance therebetween may be properly selected as occasion demands.

A pressure pocket 500a into which the fluid in the high-pressure region is introduced is formed between each bent portion 331 and the brush 200.

The pressure pocket 500a serves to support the low-pressure region-side one surface 230 of the brush 200 by the pressure of the high-pressure fluid, and the fluid in the high-pressure region is introduced into the pressure pocket 500a through clearances between the bristles of the brush 200.

Meanwhile, the bent portion 331 formed at the support portion 330c also serves to improve stiffness of the support strip 300.

In a modification example, the entirety of one surface of the support 330c may also come into close contact with the low-pressure region-side one surface 230 of the brush 200 in a state in which the above-mentioned bent portion 331 is not formed at the support portion 330c.

Since the low-pressure region-side one surface 230 of the brush 200 is supported by the pressure of the pressure pocket 500a together with the support portion 330c of the support strip 300, deformation of the brush 200 caused by a pressure difference at both sides of the brush 200 and thus a fluid leak are reduced.

The brush seal assembly 100 is pressed and supported by the anchoring member 400a by inserting the brush 200 into the brush insertion groove 13a of the sealing body 8 and inserting the support strip 300 into the support strip insertion groove 13b, and thus the installation of the brush seal assembly 100 is completed. Thus, the brush seal assembly is easily assembled through a simple structure, and thus costs for manufacturing and assembling the same may be reduced.

Figure 4:
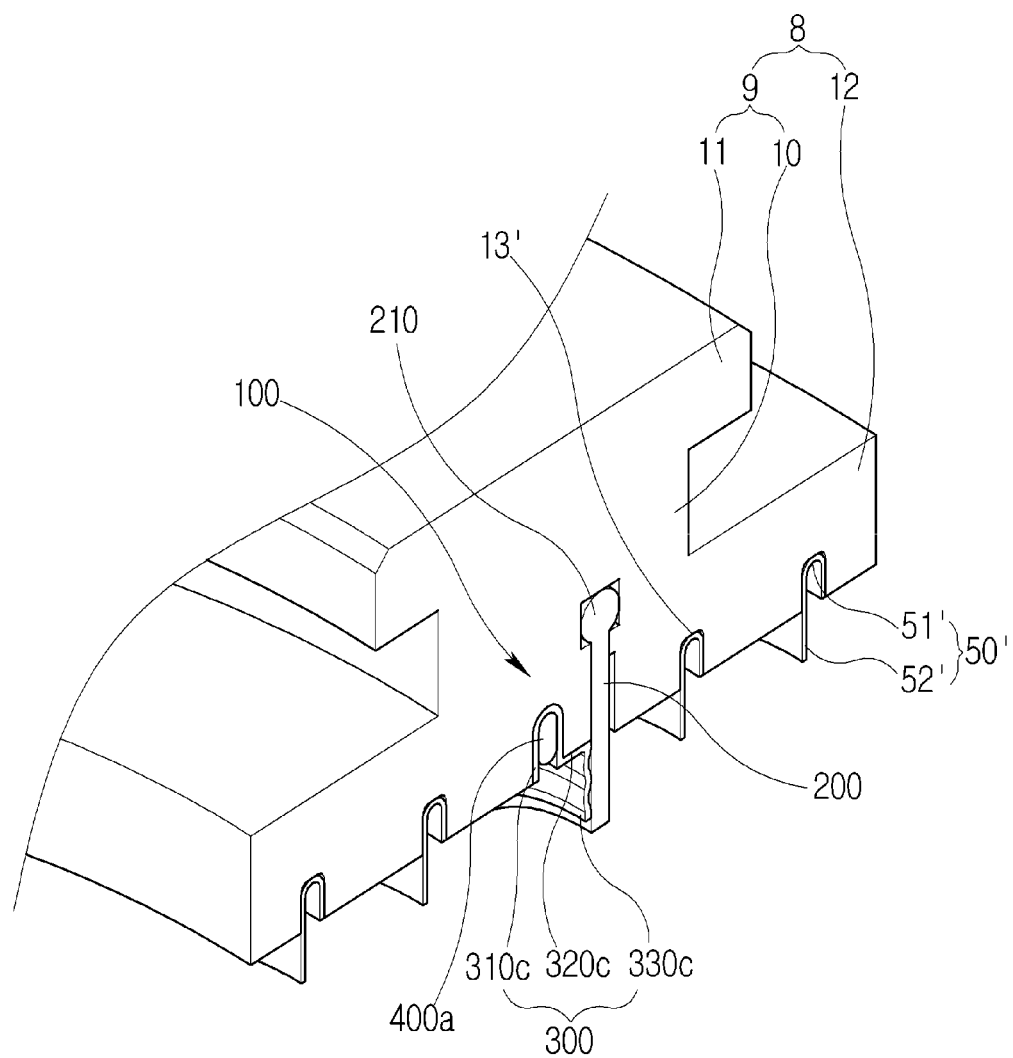
FIG. 4 is a view illustrating a use state of the brush seal assembly according to the first embodiment.

FIG. 4 is a view illustrating a use state of the brush seal assembly according to the first embodiment.

Referring to FIG. 4, the brush seal assembly 100 according to the first embodiment is mounted to the center on the back surface of the sealing body 8, and a plurality of seal strips 50' is spaced apart from each other in the width direction of the sealing body 8.

One end of each seal strip 50' is inserted into a seal strip mounting groove 13', and the other end thereof extends toward the rotor 5 (see FIG. 1). The seal strip 50' has a "J" shape as a whole, and includes a bent portion 51' inserted into the seal strip mounting groove 13' to be bent along a wall surface of the seal strip mounting groove 13' and an extension portion 52' extending toward the rotor 5 from one end of the bent portion 51'.

In this case, since the brush seal assembly has a simple structure compared to a case of forming the conventional labyrinth seal 1 (see FIG. 1), sealing between the stationary body and the rotary body may be realized at lower cost.

The brush seal assembly according to the embodiment will be described below with reference to FIG. 5. For reference, the present embodiment is accomplished by a configuration of applying the brush seal assembly 100 and the conventional labyrinth seal 1 together.

Figure 5:
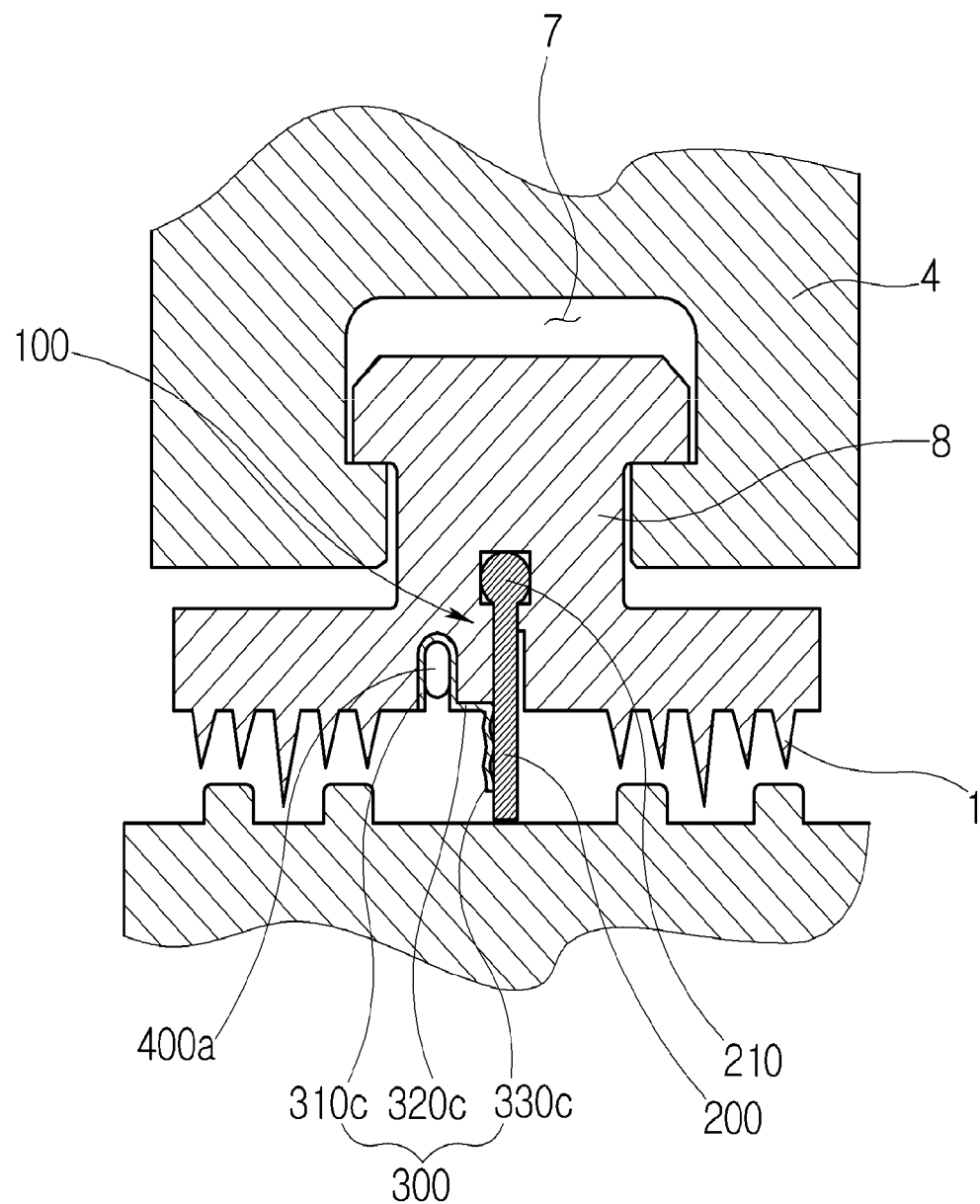
FIG. 5 is a view illustrating another use state of the brush seal assembly according to the first embodiment.

Of course, the brush seal assembly of the embodiment described below may be used together with the seal strips 50' spaced apart from each other in the width direction of the sealing body 8 as illustrated in FIG. 4, or may be used together with the conventional labyrinth seal 1 as illustrated in FIG. 5.

Figure 6:
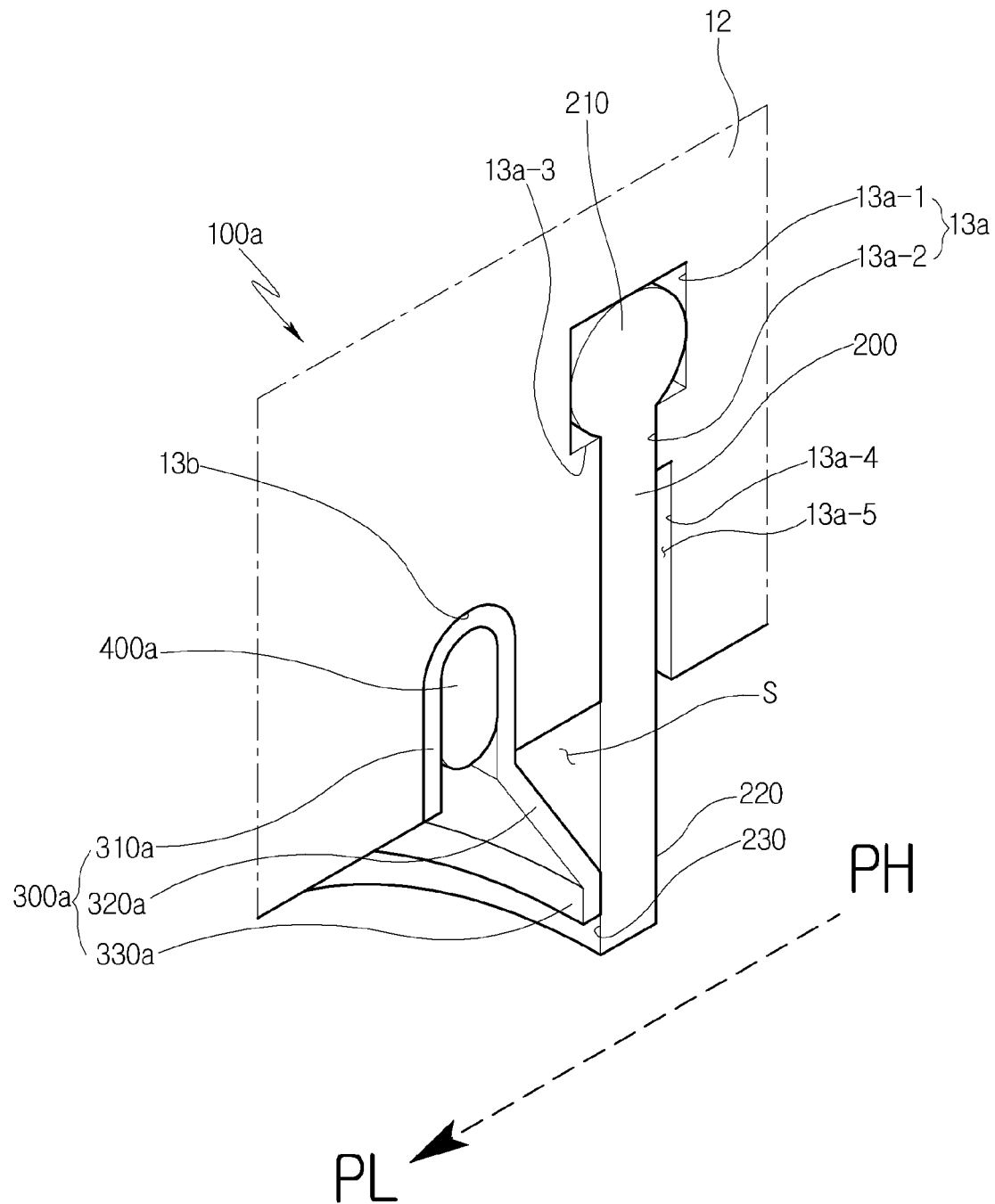
FIG. 6 is a view schematically illustrating a brush seal assembly according to a second embodiment.

FIG. 6 is a view schematically illustrating a brush seal assembly according to a second embodiment.

The brush seal assembly, which is designated by reference numeral 100a, according to the second embodiment has basic configurations similar to the brush seal assembly 100 according to the first embodiment described with reference to FIG. 3, but differs from that of the first embodiment in that an extension portion 320a of a support strip 300a is obliquely inclined.

Accordingly, the same functional configurations as those of the above-mentioned first embodiment are designated by the like reference numerals and duplicated description thereof will be omitted.

According to the second embodiment, the extension portion 320a of the support strip 300a extends to the low-pressure region-side one surface 230 of the brush 200 from one end of the insertion portion 310a and is inclined toward the rotor 5 by a predetermined angle.

An inclined angle of the extension portion 320a may be properly selected as occasion demands. An example in which a support portion 330a has a width which is relatively narrowed as a tip of the extension portion 320a is close to the lower end portion of the brush 200 is illustrated in the drawing.

In a modification example, the width of the support portion 330a may be relatively greater as the inclined angle of the extension portion 320a relative to the back surface of the body portion 12 is smaller. In this case, the bent portion 331 (see FIG. 3) as in the above-mentioned embodiment may be formed at the support portion 330a.

In accordance with the brush seal assembly 100a according to the second embodiment, a space S defined by the back surface of the body portion 12, the extension portion 320a, and the low-pressure region-side one surface 230 of the brush 200 may also function as the pressure pocket 500a (see FIG. 3) of the above-mentioned first embodiment.

Figure 7:
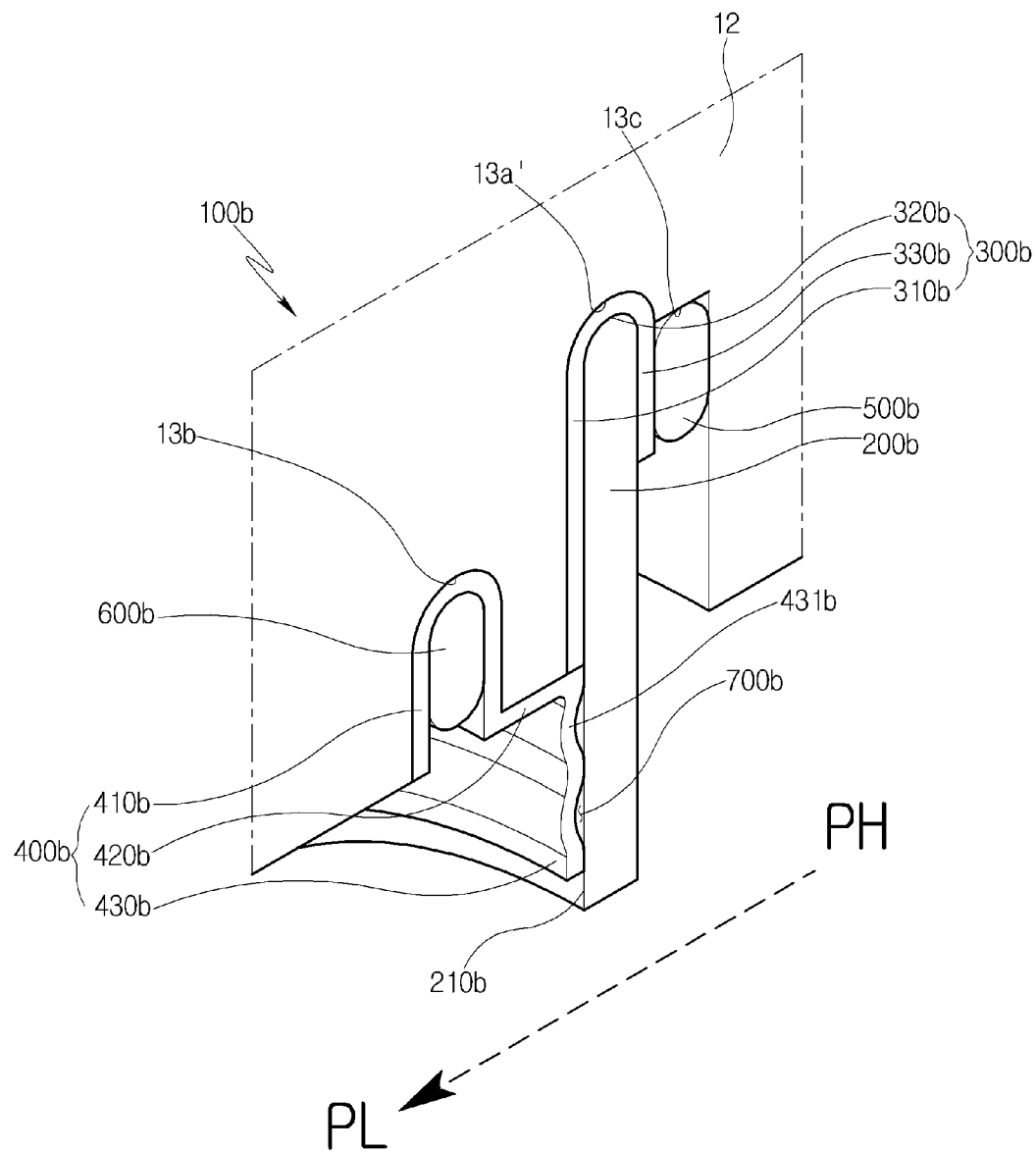
FIG. 7 is a view schematically illustrating a brush seal assembly according to a third embodiment.

FIG. 7 is a view schematically illustrating a brush seal assembly according to a third embodiment.

Referring to FIG. 7, a brush insertion groove 13a', a second support strip insertion groove 13b, and a first anchoring member insertion groove 13c are formed on a back surface of a body portion 12 in the third embodiment.

The brush insertion groove 13a' is formed at a center on the back surface of the body portion 12. The second support strip insertion groove 13*b* is spaced apart by a predetermined distance in a width direction of the body portion 12 from one side of the brush insertion groove 13*a*'. The first anchoring member insertion groove 13*c* is formed at the other side of the brush insertion groove 13*a*' so as to communicates with the brush insertion groove 13*a*'.

In this case, the first anchoring member insertion groove 13*c* is formed at the other side of the brush insertion groove 13*a*' so as to be stepped toward a rotor 5. That is, the first anchoring member insertion groove 13*c* has a bottom surface protruding toward the rotor 5 from the other side of the brush insertion groove 13*a*'. This enables a first anchoring member 500*b* press-fitted into the first anchoring member insertion groove 13*c* to intensively press a first extension portion 330*b* of a first support strip 300*b* to be described later.

Here, each cross-sectional shape of the brush insertion groove 13*a*', the second support strip insertion groove 13*b*, and the first anchoring member insertion groove 13*c* may be properly selected as occasion demands. For example, in the embodiment illustrated in FIG. 7, each of the brush insertion groove 13*a* and the second support strip insertion groove 13*b* has an arc bottom surface formed in a recessed round form, and the first anchoring member insertion groove 13*c* has a square cross-sectional shape.

The brush seal assembly, which is designated by reference numeral 100*b*, includes a brush 200*b*, a first support strip 300*b* supporting one side of the brush 200*b*, a first anchoring member 500*b* supporting the other side of the brush 200*b*, and a second support strip 400*b* spaced apart from the one side of the brush 200*b* such that one side end portion of the second support strip 400*b* is fixed while the other side end portion thereof supports one side of the brush 200*b*.

The brush 200*b* includes a plurality of bristles, and standards such as a thickness of each bristle of the brush 200*b* may be properly selected as occasion demands.

One end of the brush 200*b* is inserted into the brush insertion groove 13*a*' and the other end thereof extends toward an outer peripheral surface of the rotor 5 so that a tip of the brush 200*b* comes into contact with the outer peripheral surface of the rotor 5. Consequently, both axial sides of the rotor 5 on the basis of the brush 200*b* are sealed by the brush 200*b*.

A right pressure PH is relatively higher than a left pressure PL when viewed in the drawing, and the brush 200*b* seals a fluid flowing from a high-pressure region to a low-pressure region.

The first support strip 300*b* is inserted into the brush insertion groove 13*a*' so as to surround one end of the brush 200*b*. The first support strip 300*b* has a thin plate ring shape having a "J" cross-sectional shape, and may be made of a material such as synthetic resin having heat resistance and elasticity in addition to metal.

The first support strip 300*b* includes a first support portion 310*b* which tightly supports one side surface of the brush 200*b*, a round portion 320*b* rounded from one end of the first support portion 310*b* so as to surround one end of the brush 200*b*, and a first extension portion 330*b* extending from one end of the round portion 320*b* so as to cover a portion of the other side surface of the brush 200*b*. In this case, the other end of the first support portion 310*b* is received in the brush insertion groove 13*a*'.

The first anchoring member 500*b* is press-fitted into the first anchoring member insertion groove 13*c* to prevent separation between the brush 200*b* and the first support strip 300*b*. The first anchoring member 500*b* serves to press the brush 200*b* and the first support strip 300*b* toward an inner wall of the brush insertion groove 13*a*' so that the brush 200*b* and the first support strip 300*b* are fixed into the brush insertion groove 13*a*'.

In this case, the first support portion 310*b* of the first support strip 300*b* is interposed between the brush 200*b* and the brush insertion groove 13*a*'. The first anchoring member 500*b* is interposed between the first extension portion 330*b* of the first support strip 300*b* and an inner wall of the first anchoring member insertion groove 13*c*.

In this case, as the bottom surface of the first anchoring member insertion groove 13*c* is formed corresponding to a boundary between the round portion 320*b* and the first extension portion 330*b* of the first support strip 300*b*, the first anchoring member 500*b* press-fitted into the first anchoring member insertion groove 13*c* intensively presses the first extension portion 330*b* of the first support strip 300*b*. Thus, the brush 200*b* and the first support strip 300*b* are securely fixed into the brush insertion groove 13*a*' by pressing force of the first anchoring member 500*b*.

The second support strip 400*b* has a plate ring shape, and may be made of the same material as the first support strip 300*b*.

One side end portion of the second support strip 400*b* is fixedly inserted into the second support strip insertion groove 13*b* spaced apart from one side of the brush insertion groove 13*a*', and the other side end portion thereof supports one side of the brush 200*b*, specifically a low-pressure region-side one surface 210*b* of the brush 200*b*.

The second support strip 400*b* includes an insertion portion 410*b* inserted into the second support strip insertion groove 13*b*, a second extension portion 420*b* extending toward the brush 200*b* from one end of the insertion portion 410*b*, and a second support portion 430*b* bent from one end of the second extension portion 420*b* to support one side of the brush 200*b*.

The insertion portion 410*b* inserted into the second support strip insertion groove 13*b* is pressed toward an inner wall of the second support strip insertion groove 13*b* by a second anchoring member 600*b* press-fitted into the second support strip insertion groove 13*b* so as to be tightly fixed thereto.

The second extension portion 420*b* of the second support strip 400*b* extends from one end, which is adjacent to the brush 200*b*, of both ends of the insertion portion 410*b* along the back surface of the body portion 12 toward the low-pressure region-side one surface 210*b* of the brush 200*b*, and preferably comes into close contact with the back surface of the body portion 12.

The second support portion 430*b* of the second support strip 400*b* is vertically bent toward the rotor 5 from one end of the second extension portion 420*b* coming into contact with the low-pressure region-side one surface 210*b* of the brush 200*b*. That is, the low-pressure region-side one surface 210*b* of the brush 200*b* received in the brush insertion groove 13*a*' is supported by the first support portion 310*b* of the first support strip 300*b*, and the low-pressure region-side one surface 210*b* of the brush 200*b* protruding outward of the brush insertion groove 13*a*' is supported by the second support portion 430*b* of the second support strip 400*b*.

It is preferable that a rotor facing end of the second support portion 430*b* is further spaced radially outwardly from the rotor 5 than the other end of the brush 200*b*, namely, a rotor facing end of the brush 200*b*. This prevents rubbing generated between the second support strip 400*b* and the rotor 5, and a tip portion of the second support portion 430*b* of the second support strip 400*b* is further spaced from the outer peripheral surface of the rotor 5 compared to the tip portion of the brush 200*b* to be located inside the tip portion of the brush 200*b*, as illustrated in FIG. 7.

However, since the second support strip 400*b* has elasticity as the thin plate even though the rubbing is generated between the second support strip 400*b* and the rotor 5, heat and wear generated by the rubbing with the rotor 5 may be reduced. In addition, when the second support strip 400*b* according to the third embodiment is applied to the brush seal assembly, a distance between the second support strip 400*b* and the rotor 5 is decreased compared to the conventional plates 46 and 48 (see FIG. 2), thereby enabling sealing efficiency to be enhanced.

Meanwhile, the second support portion 430*b* of the second support strip 400*b* is formed with at least one bent portion 431*b* in the third embodiment.

Although the bent portion 431*b* has, for example, an arc cross-sectional shape, embodiments are not limited thereto. For example, the bent portion 431*b* may have a polygonal cross-sectional shape such as a semicircular cross-sectional shape, a triangular cross-sectional shape, or a square cross-sectional shape.

Alternatively, a plurality of bent portions 431*b* may be formed to be spaced apart from each other, or may be continuously formed in a wave form. That is, standards such as the number and protrusion heights of bent portions and a distance therebetween may be properly selected as occasion demands.

A pressure pocket 700*b* into which the fluid in the high-pressure region is introduced is formed between each bent portion 431*b* and the brush 200*b*.

The pressure pocket 700*b* serves to support the low-pressure region-side one surface 210*b* of the brush 200*b* by the pressure of the high-pressure fluid introduced into the pressure pocket 700*b*, and the fluid in the high-pressure region is introduced into the pressure pocket 700*b* through clearances between the bristles of the brush 200*b*.

The bent portion 431*b* formed at the second support portion 430*b* also serves to improve stiffness of the second support strip 400*b*.

In a modification example, the entirety of one surface of the second support 430*b* may also come into close contact with the low-pressure region-side one surface 210*b* of the brush 200*b* protruding outward of the brush insertion groove 13*a*' in a state in which the above-mentioned bent portion 431*b* is not formed at the second support portion 430*b*.

Since the low-pressure region-side one surface 210*b* of the brush 200*b* is supported by the pressure of the pressure pocket 700*b* together with the second support portion 430*b* of the second support strip 400*b*, deformation of the brush 200*b* caused by a pressure difference at both sides of the brush 200*b* and thus a fluid leak are reduced.

The first anchoring member 500*b* is press-fitted by inserting the brush 200*b* and the first support strip 300*b* into the brush insertion groove 13*a* of the sealing body 8, and the second anchoring member 600*b* is press-fitted by inserting the second support strip 400*b* into the second support strip insertion groove 13*b*, so that the installation of the brush seal assembly 100*b* is completed. Thus, the brush seal assembly is easily assembled through a simple structure, and thus costs for manufacturing and assembling the same may be reduced.

Figure 8:
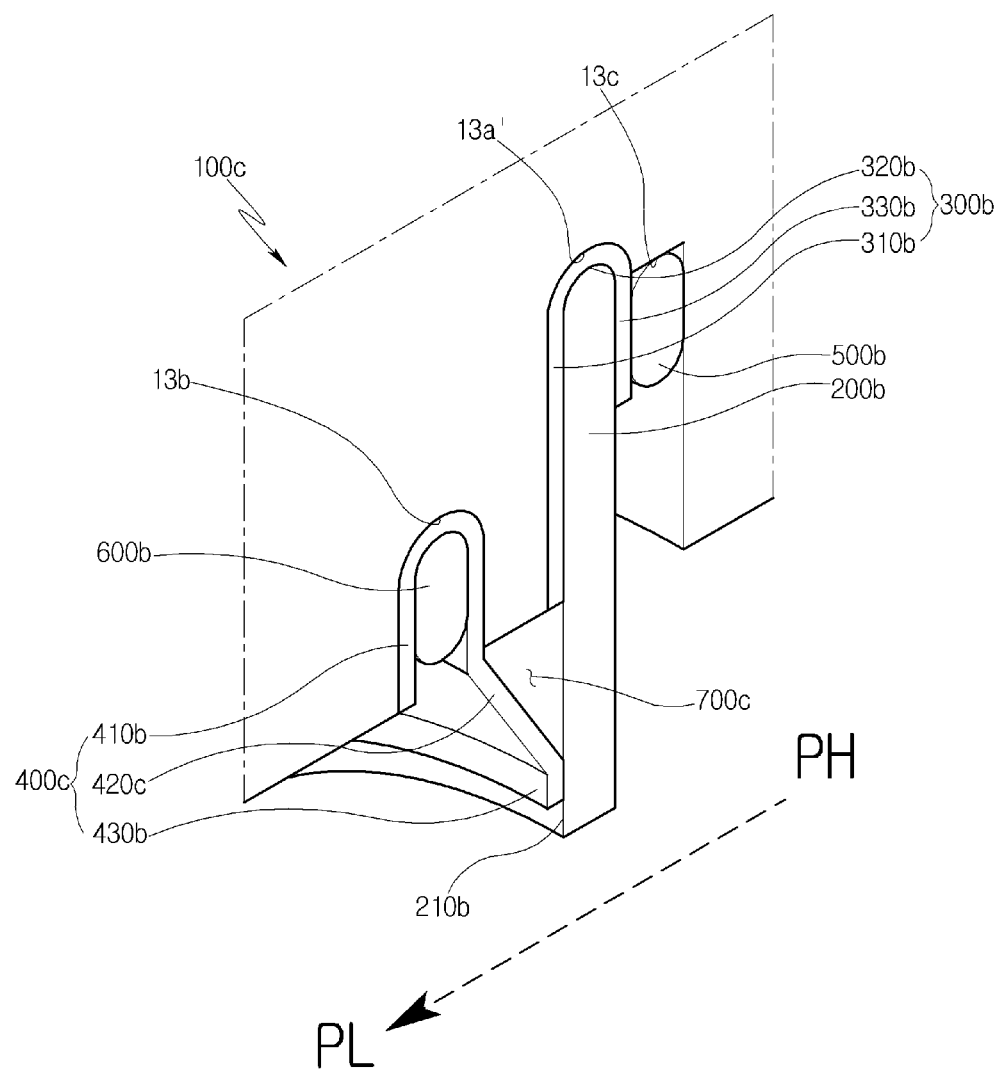
FIG. 8 is a view schematically illustrating a brush seal assembly according to a fourth embodiment.

FIG. 8 is a view schematically illustrating a brush seal assembly according to a fourth embodiment.

The brush seal assembly, which is designated by reference numeral 100*c*, according to the fourth embodiment has basic configurations similar to the brush seal assembly 100*b* according to the third embodiment described with reference to FIG. 7, but differs from that of the third embodiment in that a second extension portion 420*c* of a second support strip 400*c* is obliquely inclined.

Accordingly, the same functional configurations as those of the above-mentioned third embodiment are designated by the like reference numerals and duplicated description thereof will be omitted.

According to the fourth embodiment, the second extension portion 420*c* of the second support strip 400*c* extends to the low-pressure region-side one surface 210*b* of the brush 200*b* from one end of the insertion portion 410*b* and is inclined toward the rotor 5 by a predetermined angle.

In this case, an inclined angle of the second extension portion 420*c* may be properly selected as occasion demands. An example in which a second support portion 430*b* has a width which is relatively narrowed as a tip of the second extension portion 420*c* is close to the lower end portion of the brush 200*b* is illustrated in the embodiment illustrated in FIG. 8.

In a modification example, the width of the second support portion 430*b* may be relatively greater as the inclined angle of the second extension portion 420*a* relative to the back surface of the body portion 12 is smaller. In this case, the bent portion 431*b* (see FIG. 7) as in the above-mentioned third embodiment may be formed at the second support portion 430*b*.

In accordance with the brush seal assembly 100*c* according to the fourth embodiment, a space 700*c* defined by the back surface of the body portion 12, the second extension portion 420*c*, and the low-pressure region-side one surface 210*b* of the brush 200*b* may also function as the pressure pocket 700*b* (see FIG. 7) of the above-mentioned third embodiment.

Hereinafter, a brush seal assembly according to a fifth embodiment will be described with reference to the drawings.

Figure 9:
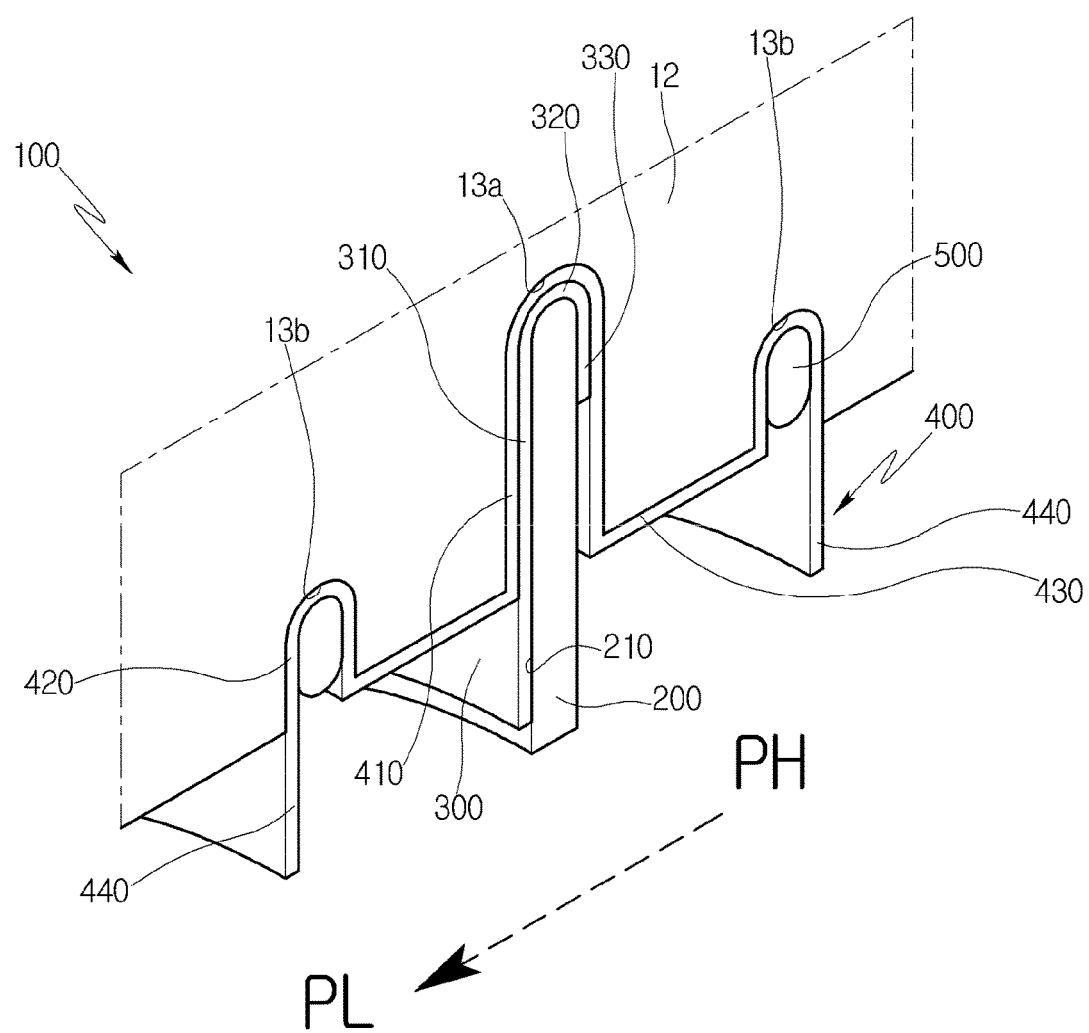
FIG. 9 is a view schematically illustrating a brush seal assembly according to a fifth embodiment.
Figure 10:
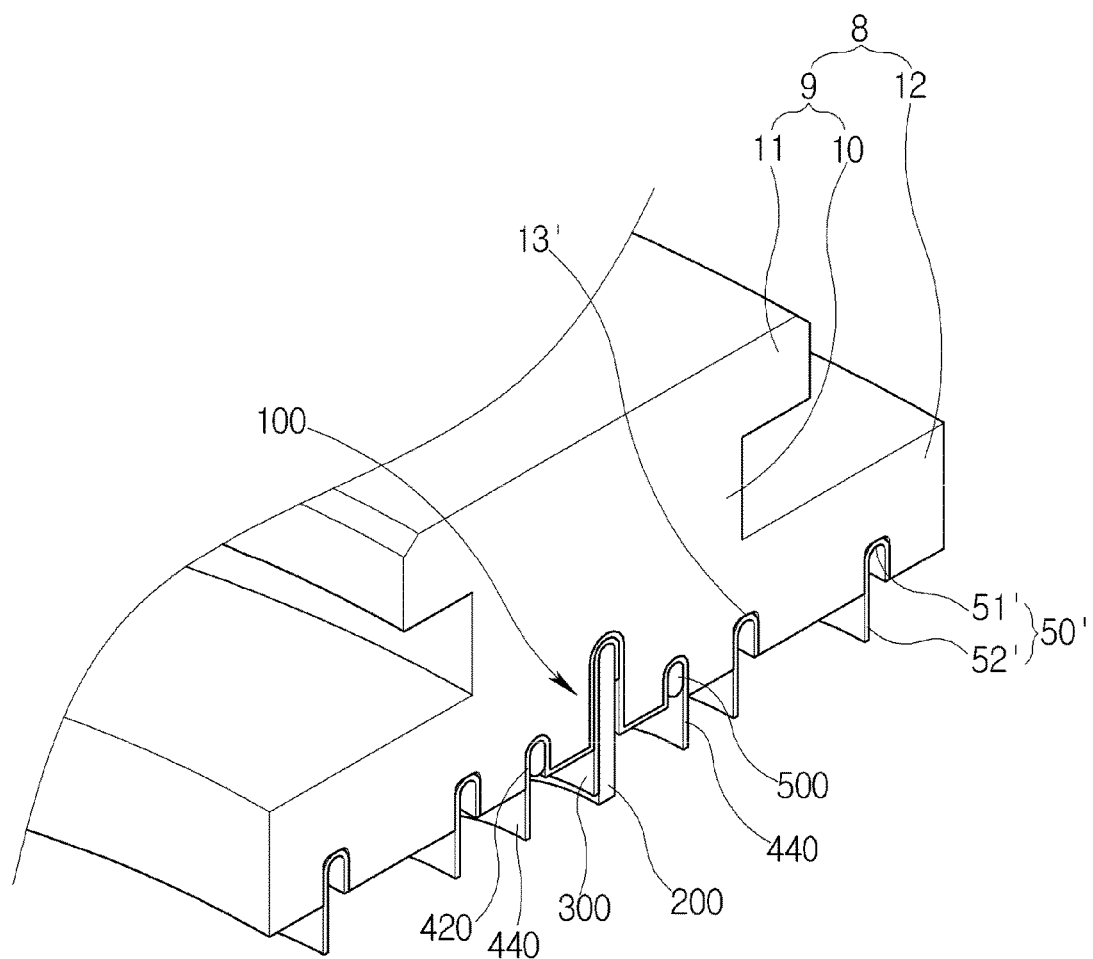
FIG. 10 is a view illustrating a use state of the brush seal assembly according to the fifth embodiment.
Figure 11:
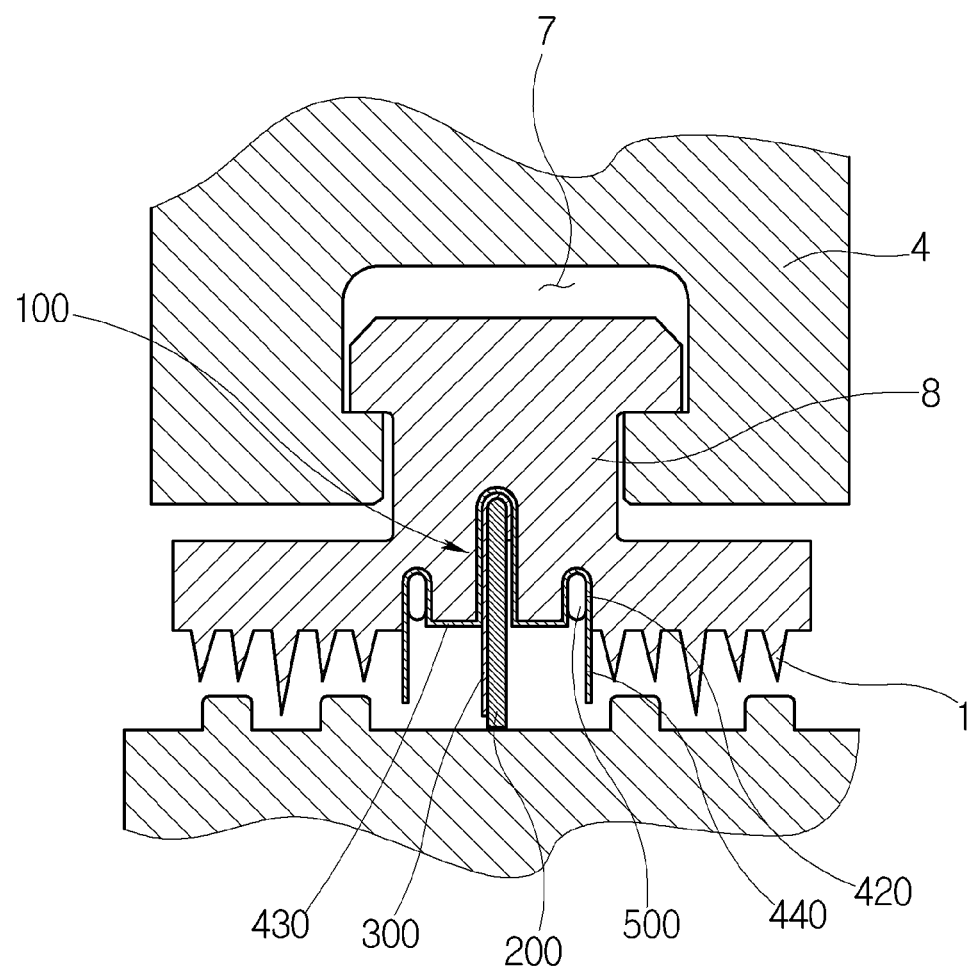
FIG. 11 is a view illustrating another use state of the brush seal assembly according to the fifth embodiment.

Referring to FIGS. 9 to 11, one side end portion of the brush seal assembly, which is designated by reference numeral 100, is inserted into and mounted to a groove formed on a back surface of a body portion 12. The brush seal assembly 100 includes a brush 200, a support strip 300 supporting one side of the brush 200, and an auxiliary strip 400 surrounding the brush 200 and the support strip 300.

The body portion 12 has a brush insertion groove 13*a* and auxiliary strip insertion grooves 13*b*. The brush insertion groove 13*a* is formed at a center on the back surface of the body portion 12, and the auxiliary strip insertion grooves 13*b* are spaced apart from both sides of the brush insertion groove 13*a* by a predetermined distance.

Each cross-sectional shape of the brush insertion groove 13*a* and the auxiliary strip insertion grooves 13*b* may be properly selected as occasion demands. For example, each of the brush insertion groove 13*a* and the auxiliary strip insertion grooves 13*b* has a bottom surface formed in a recessed round shape.

The auxiliary strip 400 is inserted in to the brush insertion groove 13*a* and the auxiliary strip insertion grooves 13*b*. The auxiliary strip 400 has a thin plate ring shape, and may be made of a material such as synthetic resin having heat resistance and elasticity in addition to metal.

When the auxiliary strip 400 is mounted to the brush seal assembly, an intermediate portion of the auxiliary strip 400 is inserted into the brush insertion groove 13*a* and both sides of the auxiliary strip 400 are inserted into the auxiliary strip insertion grooves 13*b*.

The auxiliary strip 400 comes into close contact with an inner wall of the brush insertion groove 13a and inner walls of the auxiliary strip insertion grooves 13b along the back surface of the body portion 12. The auxiliary strip 400 mounted into the brush insertion groove 13a and the auxiliary strip insertion grooves 13b has a fork or trident shape as a whole, and the brush insertion groove 13a has a deeper depth than that of each auxiliary strip insertion groove 13b.

The auxiliary strip 400 includes a first insertion portion 410 inserted into the brush insertion groove 13a, second insertion portions 420 inserted into the respective auxiliary strip insertion grooves 13b, and connection portions 430 connecting both ends of the first insertion portion 410 to respective ends of the second insertion portions 420.

A blade portion 440 extends toward a rotor 5 from the other end of each of the second insertion portions 420. A distance between the blade portion 440 and the rotor 5 may be longer than a distance between the brush 200 and the rotor 5 to be described later. A distance between the blade portion 440 and the rotor 5 may be equal to a distance between the support strip 300 and the rotor 5 to be described later.

A rotor facing end of the auxiliary strip 400 is further spaced radially outwardly from the rotor 5 than a rotor facing end of the brush 200 to be described later for prevention of rubbing between the auxiliary strip 400 and the rotor 5.

Meanwhile, the brush 200 includes a plurality of bristles, and standards such as a thickness of each bristle of the brush 200 may be properly selected as occasion demands.

One end of the brush 200 is inserted into the brush insertion groove 13a formed at the center on the back surface of the body portion 12 and the other end thereof extends toward an outer peripheral surface of the rotor 5, so that a tip of the brush 200 comes into contact with the outer peripheral surface of the rotor 5. Consequently, both axial sides of the rotor 5 on the basis of the brush 200 are sealed by the brush 200.

A right pressure PH of the brush 200 is relatively higher than a left pressure PL when viewed in the drawing, and the brush 200 seals a fluid flowing from a high-pressure region to a low-pressure region.

In this case, the support strip 300 comes into close contact with one surface of the brush 200, namely, a low-pressure region-side one surface 210 of the brush 200, and the support strip 300 serves to prevent deformation of the brush 200 caused by a pressure difference at both sides of the brush 200.

The support strip 300 has a thin plate ring shape having a "J" cross-sectional shape, and may be made of a material such as synthetic resin having heat resistance and elasticity in addition to metal.

The support strip 300 includes a support portion 310 supporting one side surface of the brush 200 and a round portion 320 rounded in an arc form from one end of the support portion 310 so as to surround one end of the brush 200.

In addition, an extension portion 330 preferably extends from one end of the round portion 320 by a predetermined length for preventing separation of the support strip 300. That is, one end of the support strip 300 is bent to surround one end of the brush 200 so that the support strip 300 covers a portion of the other side surface of the brush 200.

In this case, the other end of the support strip 300 is located inside the other end of the brush 200. This prevents rubbing from being generated between the support strip 300 and the rotor 5, and a tip portion of the support strip 300 is located at a point further spaced from the outer peripheral surface of the rotor 5 compared to a tip portion of brush 200.

That is, the rotor facing end of the support strip 300 is further spaced radially outwardly from the rotor 5 than the rotor facing end of the brush 200.

However, since the support strip 300 has elasticity as the thin plate, heat and wear generated by the rubbing with the rotor 5 may be reduced. The distance between the support strip 300 and the rotor 5 is decreased compared to the conventional plates, thereby enabling sealing efficiency to be enhanced.

The brush 200 and the support strip 300 are inserted into the brush insertion groove 13a formed on the center of the back surface of the body portion 12 of the sealing body 8 (see FIG. 1) in a state in which one end of the brush 200 is surrounded by the round portion 320 of the support strip 300.

The auxiliary strip 400 is first mounted into the brush insertion groove 13a and then the brush 200 and the support strip 300 are press-fitted into the brush insertion groove 13a so as to be surrounded by the auxiliary strip 400. That is, the brush 200 and the support strip 300 are fixedly fitted between bent portions of the auxiliary strip 400 surrounded along the inner wall of the brush insertion groove 13a.

An anchoring member 500 is press-fitted into each auxiliary strip insertion groove 13b for preventing separation of the auxiliary strip 400 from the auxiliary strip insertion groove 13b.

The anchoring member 500 presses one side of the auxiliary strip 400 toward the inner wall of the auxiliary strip insertion groove 13b so that the auxiliary strip 400 is securely fixed into the auxiliary strip insertion groove 13b.

For example, the anchoring member 500 may be a ring-shaped elastic body. In addition, the anchoring member 500 is elongated outward, and thus may have a wire shape in which a plurality of wires is twisted in a longitudinal direction thereof.

The auxiliary strip 400 is inserted into the pair of auxiliary strip insertion grooves 13b, and thus both sides of the auxiliary strip 400 are fixed into the auxiliary strip insertion grooves 13b by the anchoring members 500. In addition, the auxiliary strip 400, the brush 200, and the support strip 300 are press-fitted into the brush insertion groove 13a, to thereby be securely fixed into the brush insertion groove 13a by pressing force therebetween.

Since the low-pressure region-side one surface 210 of the brush 200 is supported by the support portion 310 of the support strip 300 and the support portion 310 of the support strip 300 is supported by the auxiliary strip 400 interposed between the inner wall of the brush insertion groove 13a and the support strip 300, deformation of the brush 200 caused by a pressure difference at both sides of the brush 200 and thus a fluid leak are reduced.

In addition, since the blade portions 440 of the auxiliary strip 400 extend from both sides of the brush 200 toward the rotor 5, sealing effect may be enhanced by the auxiliary strip 400 together with the brush 200.

The auxiliary strip 400 is inserted into the brush insertion groove 13a and the auxiliary strip insertion grooves 13b and then the brush 200 and the support strip 300 are press-fitted into the brush insertion groove 13a, with the consequence that the installation of the brush seal assembly 100 is completed. Accordingly, the brush seal assembly is easily assembled through a simple structure, and thus costs for manufacturing and assembling the same may be reduced.

FIG. 10 is a view illustrating a use state of the brush seal assembly according to the fifth embodiment.

The brush seal assembly 100 according to the fifth embodiment is mounted to the center on the back surface of the sealing body 8, and a plurality of seal strips 50' is spaced apart from each other in the width direction of the sealing body 8.

In this case, one end of each seal strip 50' is inserted into a seal strip mounting groove 13', and the other end thereof extends toward the rotor. The seal strip 50' has a "J" shape as a whole, and may be made of the same material as the above-mentioned support strip or auxiliary strip.

The seal strip 50' includes a fixed portion 51' press-fitted into the seal strip mounting groove 13' to be rounded along a wall surface of the seal strip mounting groove 13' and a sealing portion 52' extending toward the rotor 5 from one end of the fixed portion 51'.

In this case, since the brush seal assembly has a simple structure compared to a case of forming the conventional labyrinth seal 1 (see FIG. 1), sealing between the stationary body and the rotary body may be realized at lower cost.

The present embodiment is accomplished by applying the brush seal assembly 100 and the conventional labyrinth seal 1 together. FIG. 11 is a view illustrating a use state of another example in which the brush seal assembly 100 and the conventional labyrinth seal 1 are applied together.

Of course, a brush seal assembly 100a of a sixth embodiment described below may be used together with the seal strips 50' spaced apart from each other in the width direction of the sealing body 8, or may be used together with the conventional labyrinth seal 1.

Hereinafter, a brush seal assembly according to a sixth embodiment will be described with reference to the drawing.

Figure 12:
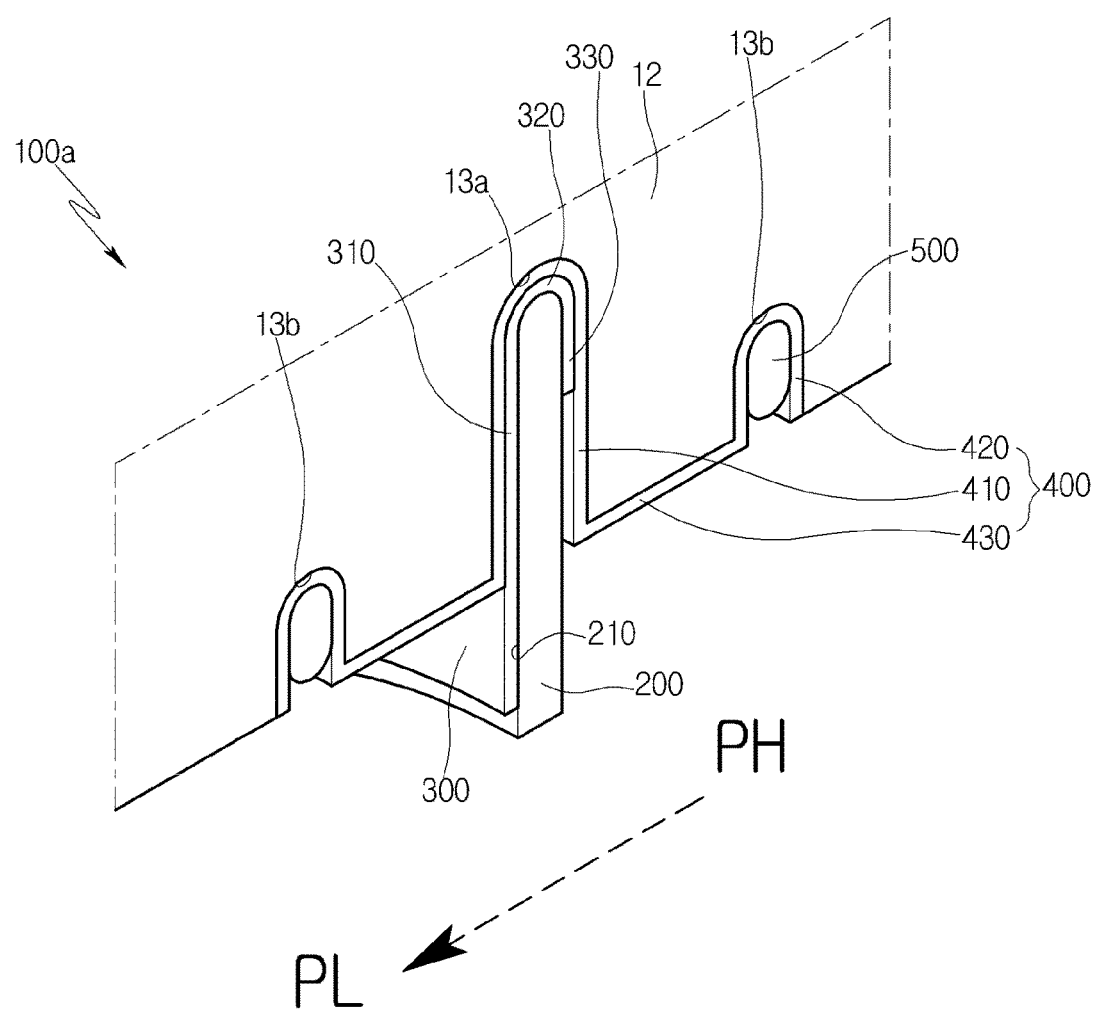
FIG. 12 is a view schematically illustrating a brush seal assembly according to a sixth embodiment.

Referring to FIG. 12, the brush seal assembly 100a has basic configurations similar to the brush seal assembly 100 according to the above-mentioned fifth embodiment, but differs from that of the fifth embodiment in that both ends of an auxiliary strip 400 are received in auxiliary strip insertion grooves 13b. Accordingly, the same functional configurations as those of the above-mentioned fifth embodiment are designated by the like reference numerals and duplicated description thereof will be omitted.

According to the sixth embodiment, both ends of the auxiliary strip 400 are located inside the auxiliary strip insertion grooves 13b. That is, the present embodiment does not have the blade portion 400 as in the above-mentioned fifth embodiment.

The sixth embodiment may be applied when a function of assisting and sealing the brush 200 is sufficiently performed by the seal strip 50' in FIG. 10 or the labyrinth seal 1 in FIG. 11. In this case, the auxiliary strip 400 serves to securely fix the brush 200 and the support strip 300 into the brush insertion groove 13a.

Hereinafter, another example of the support strip provided in the brush seal assembly of the fifth embodiment will be described with reference to the drawings.

Figure 13:
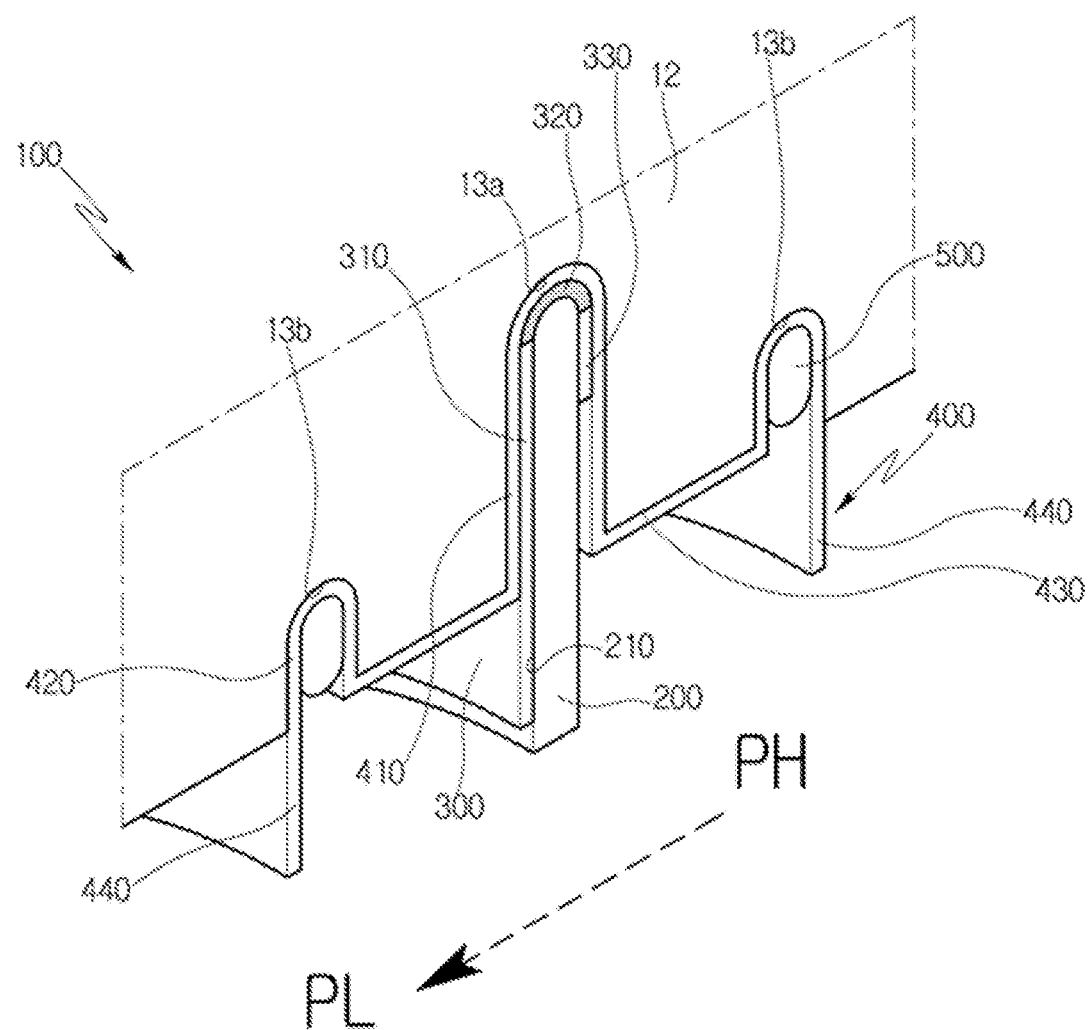
FIGS. 13 and 14 are views illustrating another example of a support strip according to the fifth embodiment.
Figure 14:
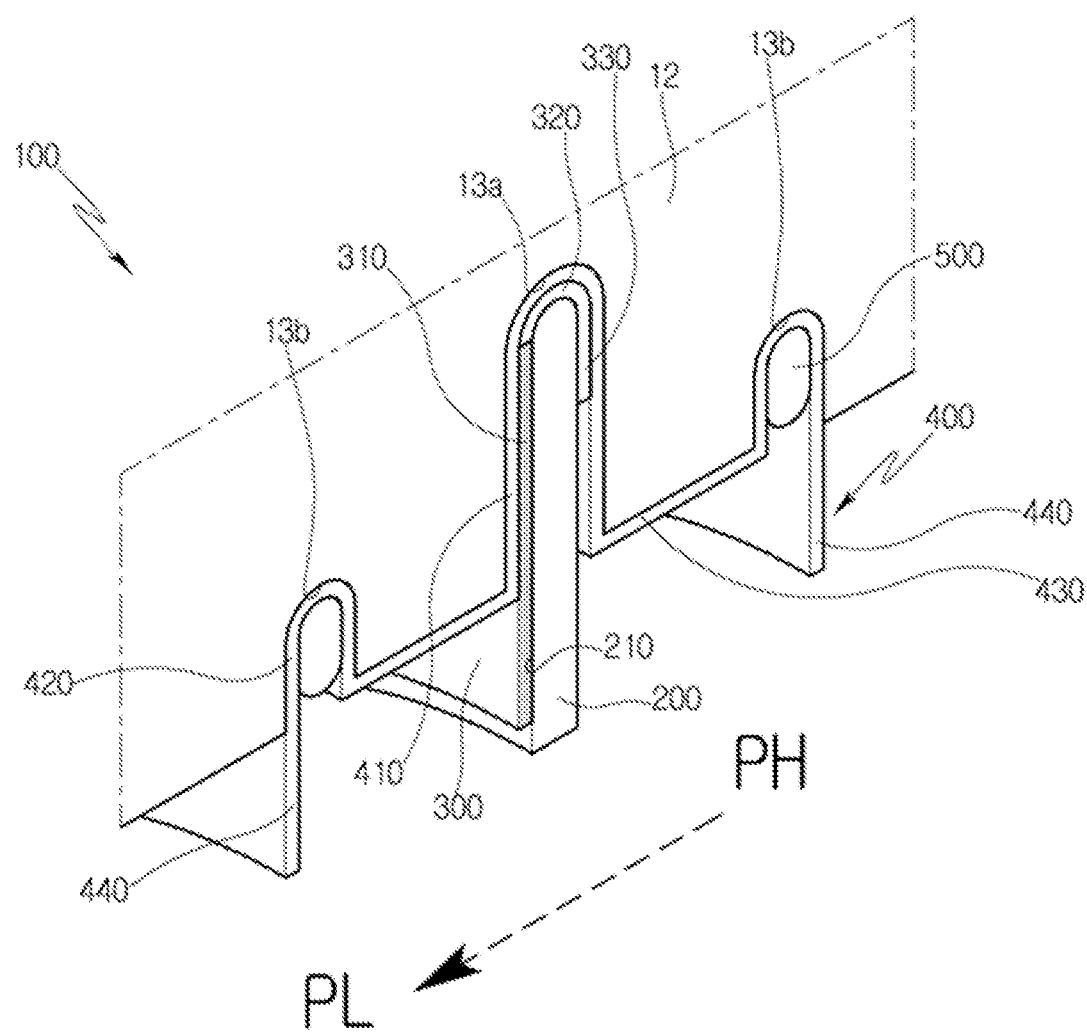

Referring to FIGS. 13 and 14, the support strip 300 has a round portion 320 made of a material having elastic restoring force. In this case, the brush 200 may be moved upward by a predetermined amount while the round portion 320 is elastically deformed when a load is applied to the brush 200, thereby allowing deformation generation to be reduced.

The support strip 300 has a support portion 310 made of an elastic material such that the elastic restoring force of the support portion 310 is maintained in a longitudinal direction. In this case, force for supporting the brush 200 may be improved when the high-pressure fluid is moved to the brush 200, and thus the support portion 310 uniformly maintains an amount of the fluid moved via the brush 200 by moving the entirety of the bush 200 to an original position while being elastically deformed in a moment and then returned to an original position even though the brush 200 is bent in a direction in which the support strip 300 is located. Consequently, sealing efficiency may be improved.

Hereinafter, another example of the anchoring member according to the an embodiment will be described with reference to the drawing.

Figure 15:
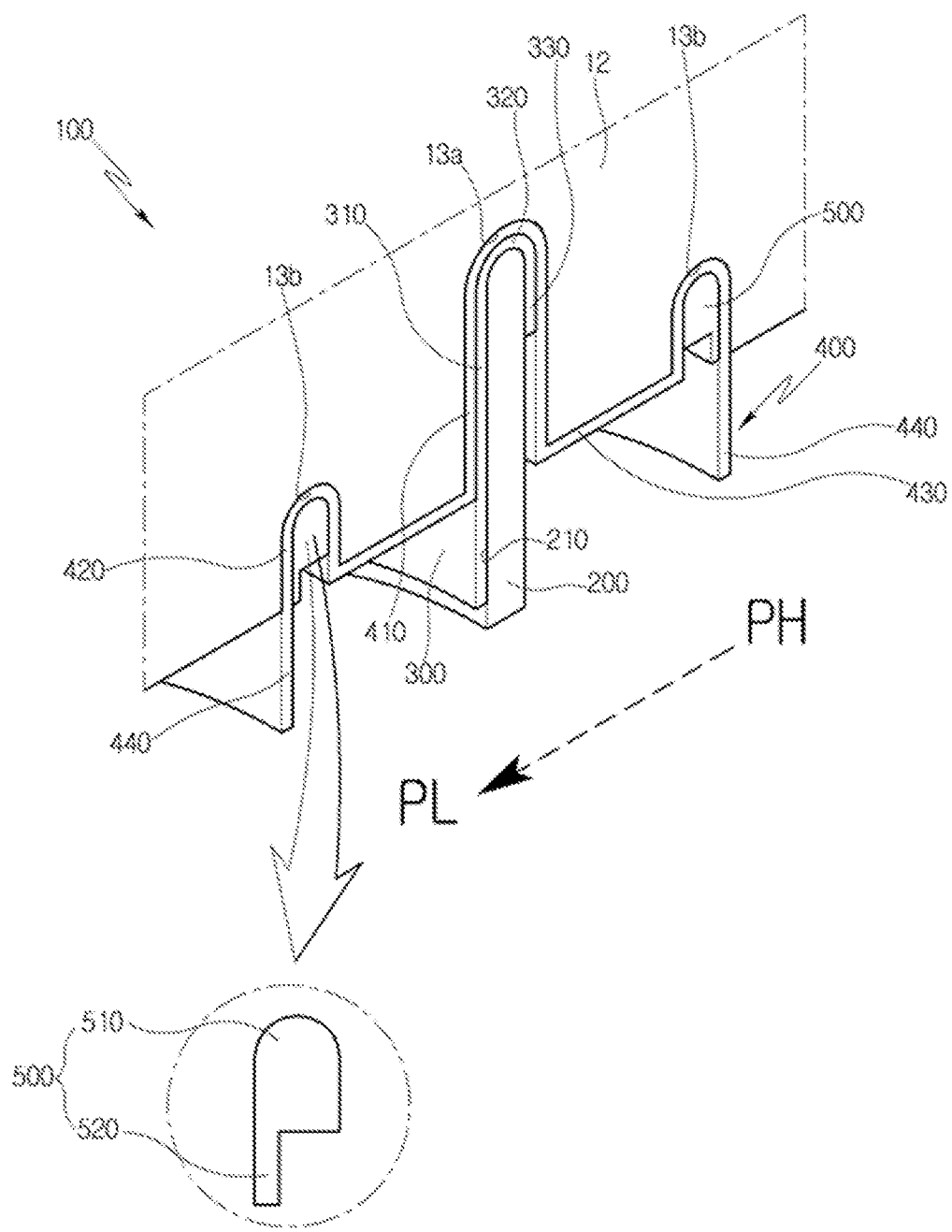
FIG. 15 is a view illustrating another example of an anchoring member.

Referring to FIG. 15, each anchoring member, which is designated by reference numeral 500, includes an anchoring body 510 which has a shape corresponding to the associated auxiliary strip insertion groove 13b and is inserted therein, and an anchoring extension portion 520 extending downward from the anchoring body 510 in a state of coming into close contact with the auxiliary strip 400.

The anchoring body 510 has an upper surface rounded upward and a lower surface extending horizontally in a transverse direction, so as to be stably inserted into the auxiliary strip groove 13b.

In addition, the anchoring extension portion 520 extends by a predetermined length in a state of coming into close contact with the outer peripheral surface of the blade portion 440, thereby simultaneously supporting the blade portion 440. Consequently, force for supporting the auxiliary strip 400 is improved.

Hereinafter, another example of the auxiliary strip according to an embodiment will be described with reference to the drawings.

Figure 16:
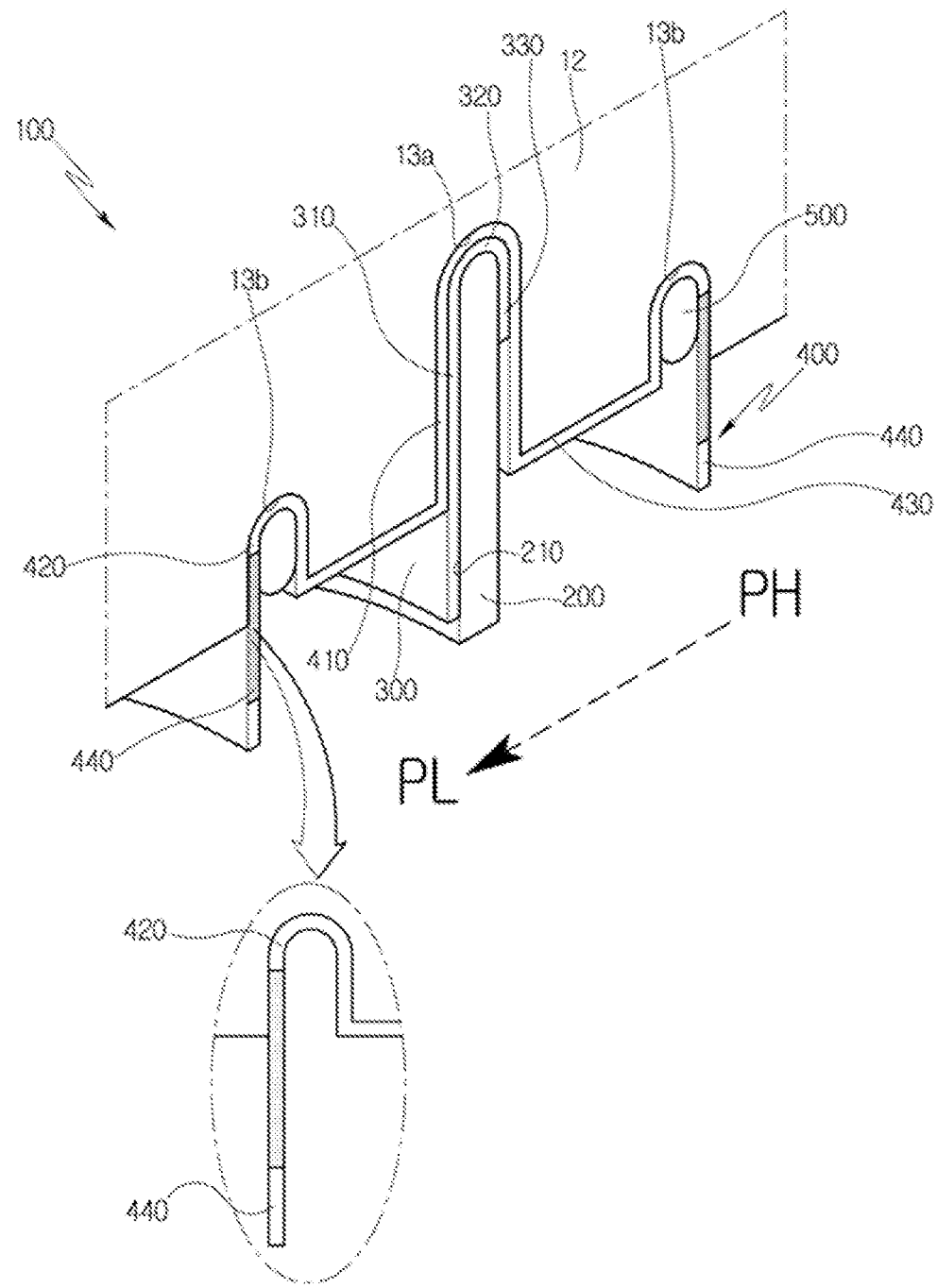
FIGS. 16 and 17 are views illustrating another example of an auxiliary strip.
Figure 17:
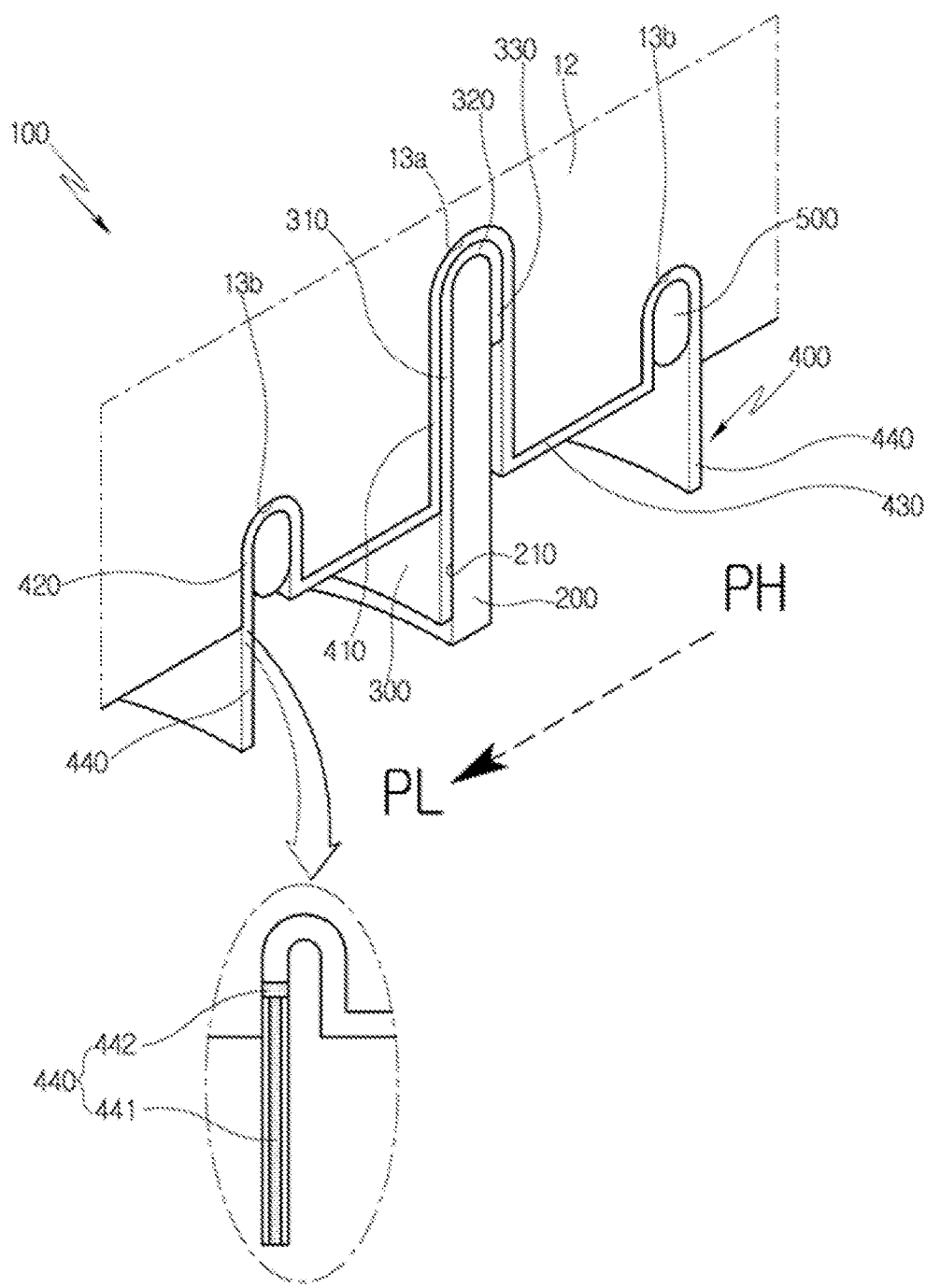

Referring to FIGS. 16 and 17, the blade portion 440 is made of an elastic material having elastic restoring force. In this case, the blade portion 440 may be elastically deformed in a moment in a movement direction of a high-pressure fluid by a pressure difference generated when the high-pressure fluid is moved together with the brush 200 and then returned to an original position, thereby moving the fluid by a predetermined amount. Consequently, sealing efficiency may be improved.

The blade portion 440 includes a first elastic portion 441 extending upward from a lower end thereof and a second elastic portion 442 extending transversely from an upper end of the first elastic portion 441.

The first elastic portion 441 uniformly maintains elastic restoring force by a difference of pressure applied in a vertical or horizontal direction or external force, thereby allowing sealing efficiency to be improved through the auxiliary strip 400.

The second elastic portion 442 is formed at a position before the auxiliary strip insertion groove 13b is formed in a round form, thereby effectively supporting and distributing stress concentration generated by the fluid using the elastic restoring force at a position at which the stress concentration is high. Consequently, deformation and damage due to the stress concentration may be prevented. As a result, since durability of the brush seal assembly is uniformly maintained even though the auxiliary strip 400 is used for a long time and a replacement time is relatively long, repair cost according to replacement may be reduced.

As is apparent from the above description, in accordance with a brush seal assembly according to exemplary embodiments, since one surface of a brush is supported by a support strip having a thin thickness, heat and wear generated by rubbing with a rotor can be reduced compared to the related art.

Since a fluid leak is decreased by reducing a distance between the rotor and the support strip supporting the brush, sealing effect and turbine efficiency may be improved. It is possible to provide the brush seal assembly which is easily assembled through a simple structure and manufactured at low cost.

It will be apparent to those skilled in the art that various changes and modifications may be made without departing from the spirit and scope of the embodiments as defined in the following claims.

The embodiments discussed have been presented by way of example only and not limitation. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, the claims should not be limited by the language chosen under a heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A brush seal assembly, comprising:
    a diaphragm that includes:
        a first recess in a rotor facing surface, the first recess providing a brush insertion groove, and
        a second recess distinct and spaced apart from the first recess in the rotor facing surface, the second recess providing a support strip insertion groove;
    a brush that includes:
        a first end disposed in the brush insertion groove, and
        a second end that protrudes toward a rotor; and
    a first support strip spaced apart from a first side of the brush so that:
        a first side end portion of the support strip is fixed and disposed in the support strip insertion groove, and
        a second side end portion of the support strip supports the first side of the brush.

2. The brush seal assembly according to claim 1, wherein the first support strip further comprises:
    an insertion portion disposed in the support strip insertion groove,
    an extension portion extending toward the brush from one end of the insertion portion, and
    a support portion bent from an end of the extension portion to support the first side of the brush.

3. The brush seal assembly according to claim 2, wherein the support portion includes at least one bent portion.

4. The brush seal assembly according to claim 1, wherein the brush insertion groove further comprises:
    a first insertion groove into which the brush is inserted, and
    a second insertion groove extending toward the rotor from the first insertion groove and having a smaller width than the first insertion groove.

5. The brush seal assembly according to claim 4, wherein a brush facing surface of the second insertion groove has a stepped portion so that a predetermined clearance is formed between the brush and the stepped portion.

6. The brush seal assembly according to claim 1, further comprising:
    a second support strip supporting the first side of the brush; and
    a first anchoring member supporting a second side of the brush.

7. The brush seal assembly according to claim 6, wherein a first end of the second support strip are disposed in the brush insertion groove.

8. The brush seal assembly according to claim 6, further comprising a second anchoring member press-fitted into the support strip insertion groove in order to fix the first support strip into the support strip insertion groove.

9. The brush seal assembly according to claim 6, wherein the second support strip comprises a support portion supporting a first side surface of the brush, a round portion rounded from one end of the support portion so as to surround one end of the brush, and a first extension portion extending from an end of the round portion so as to cover a portion of a second side surface of the brush.

10. The brush seal assembly according to claim 7, wherein the first support strip comprises:
    an extension portion extending toward the brush from the first side end portion, and
    a support portion bent from an end of the extension portion to support the first side of the brush.

11. A brush seal assembly, comprising:
    a diaphragm that includes a first recess in a rotor facing surface, the recess providing a brush insertion groove;
    a brush that includes:
        a first end disposed in the brush insertion groove, and
        a second end that protrudes toward a rotor;
    a support strip supporting a first side of the brush; and
    an auxiliary strip including a first portion and a second portion, the first portion extending around the brush and the support strip and disposed in the brush insertion groove, and the second portion disposed outside the brush insertion groove.

12. The brush seal assembly according to claim 11, wherein:
    a first side of the auxiliary strip is inserted into a first auxiliary strip insertion groove formed in the diaphragm at a first side of the brush insertion groove, and
    a second side of the auxiliary strip is inserted into a second auxiliary strip insertion groove formed in the diaphragm at a second side of the brush insertion groove.

13. The brush seal assembly according to claim 12, wherein
    at least a portion of the first portion of the auxiliary strip disposed in the brush insertion groove provides a first insertion portion, and
    the auxiliary strip further comprises:
        a second insertion portion disposed in the first auxiliary strip insertion groove,
        a third insertion portion disposed in the second auxiliary strip insertion groove, a first connection portion connecting a first end of the first insertion portion to a first end of the second insertion portion, a second connection portion connecting a first end of the second insertion portion to a first end of the third insertion portion, and a blade portion extending toward the rotor from second ends of each of the second and third insertion portions respectively.

14. A brush seal assembly, comprising:

a brush that includes:
   a first end disposed in a side of a diaphragm, and
   a second end that protrudes toward a rotor;

a support strip supporting a first side of the brush;

an auxiliary strip surrounding the brush and the support strip, wherein:
   an intermediate portion of the auxiliary strip is inserted into a brush insertion groove formed on a back surface of the diaphragm,
   a first side of the auxiliary strip is inserted into a first auxiliary strip insertion groove formed at a first side of the brush insertion groove, and
   a second side of the auxiliary strip is inserted into a second auxiliary strip insertion groove formed at a second side of the brush insertion groove;

a first anchoring member press-fitted in the first auxiliary strip insertion groove such that the first side of the auxiliary strip is fixed into the first auxiliary strip insertion groove; and a second anchoring member press-fitted in the second auxiliary strip insertion groove such that the second side of the auxiliary strip is fixed into the second auxiliary strip insertion groove.

15. The brush seal assembly according to claim 11, wherein:
   the support strip comprises a support portion supporting a first side surface of the brush, and
   a round portion rounded from an end of the support portion so as to surround one end of the brush,
   wherein the support portion includes an elastic material such that elastic restoring force of the support portion is maintained in a longitudinal direction.

16. The brush seal assembly according to claim 15, wherein the round portion includes a material having elastic restoring force.

17. The brush seal assembly according to claim 13, wherein the blade portion includes an elastic material that maintains elastic restoring force.

18. The brush seal assembly according to claim 13, wherein the blade portion comprises:
   a first elastic portion extending upward from a lower end of the blade; and
   a second elastic portion extending transversely from an upper end of the first elastic portion.

19. The brush seal assembly according to claim 14, wherein the first anchoring member comprises:
   an anchoring body inserted into the first auxiliary strip insertion groove and having a shape corresponding to the first auxiliary strip insertion groove; and
   an anchoring extension portion extending from the anchoring body and coming into contact with the first auxiliary strip.

* * * * *